United States Patent
Sebbag et al.

(10) Patent No.: US 7,227,114 B2
(45) Date of Patent: Jun. 5, 2007

(54) METHOD OF ESTIMATING THE ATTITUDE OF A SPACE DEVICE WITH IMPROVED PRECISION

(75) Inventors: Isabelle Sebbag, Toulouse (FR); Lionel Perret, Saint Pierre de Lages (FR)

(73) Assignee: Centre National D'Etudes Spatiales, Paris (FR)

( * ) Notice: Subject to any disclaimer, the term of this patent is extended or adjusted under 35 U.S.C. 154(b) by 20 days.

(21) Appl. No.: 10/498,310

(22) PCT Filed: Dec. 11, 2002

(86) PCT No.: PCT/FR02/04287

§ 371 (c)(1),
(2), (4) Date: Jun. 10, 2004

(87) PCT Pub. No.: WO03/050630

PCT Pub. Date: Jun. 19, 2003

(65) Prior Publication Data

US 2005/0161580 A1   Jul. 28, 2005

(30) Foreign Application Priority Data

Dec. 12, 2001   (FR) ................................. 01 16034

(51) Int. Cl.
*G01C 21/02*   (2006.01)

(52) U.S. Cl. .................. 250/203.1; 250/203.6
(58) Field of Classification Search ............ 250/203.1, 250/203.4, 203.6, 206.1, 206.2
See application file for complete search history.

(56) References Cited

U.S. PATENT DOCUMENTS

| | | | |
|---|---|---|---|
| 3,265,871 A * | 8/1966 | Willis .......................... | 701/226 |
| 4,617,634 A | 10/1986 | Izumida et al. .............. | 364/455 |
| 5,177,686 A | 1/1993 | Boeinghoff et al. ......... | 364/459 |
| 6,227,496 B1 | 5/2001 | Yoshikawa et al. ......... | 244/171 |

FOREIGN PATENT DOCUMENTS

WO    WO97/11882    4/1997

* cited by examiner

*Primary Examiner*—Que T. Le
(74) *Attorney, Agent, or Firm*—Steptoe & Johnson LLP

(57) ABSTRACT

A method of determining the attitude of a spacecraft is provided. The method may include sensing the projections of a plurality of stars on a sensor, converting the projections into sensor-star directions, and determining the angular values of the spacecraft relative to the stars. The method uses equations to introduce focal length errors into the equations which convert the projections into star-sensor directions, thereby reducing the uncertainty introduced by incomplete knowledge of the errors on the results of the attitude angles of the spacecraft.

12 Claims, 27 Drawing Sheets

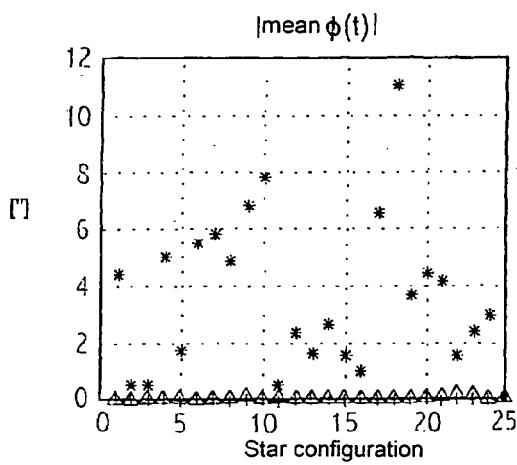
FIG.33a
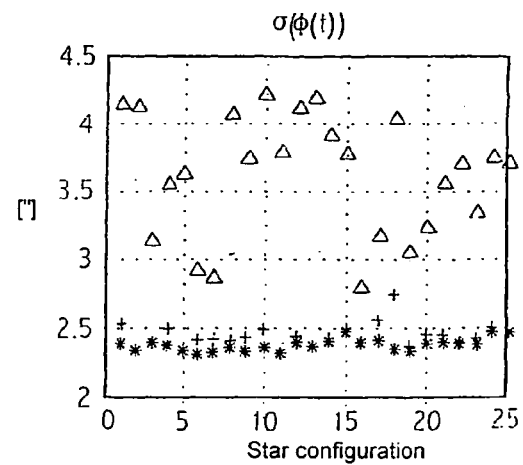
FIG.33b
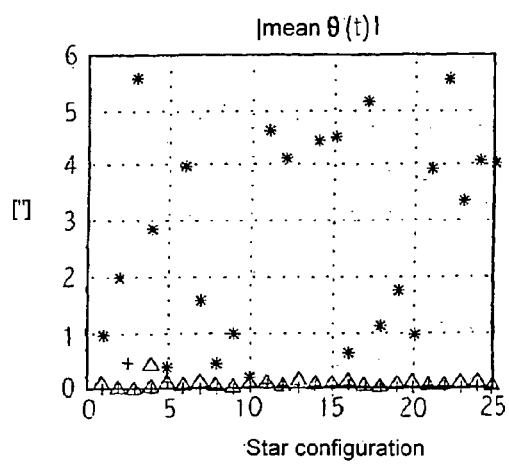
FIG.33c
FIG.33d
FIG.33e
FIG.33f

METHOD OF ESTIMATING THE ATTITUDE OF A SPACE DEVICE WITH IMPROVED PRECISION

BACKGROUND OF THE INVENTION

The invention relates to estimating the attitude of a spacecraft such as a satellite by means of a star sensor mounted on such a craft, and the invention relates more precisely to reducing errors that appear in such attitude estimation.

More precisely, the present invention relates to reducing so-called "field of view" (FOV) errors.

Nowadays, the performance expected of an observation satellite is very ambitious in terms of absolute localization: for example, accuracy of 10 meters (m) is required in 90% of cases and of 20 m in 99.7% of cases. The main factors contributing to such performance are error in determining attitude, and also thermoelastic deformation between the instrument line of sight and the attitude sensors.

For example, it is possible to define and propose a "gyrostellar" attitude measuring system based on three very high performance fiber optic gyros (FOGs) and three wide-angle ($\approx 25°$) star sensors.

Star sensors present various sources of error in measuring attitude, which can be classified depending on their time nature. Generally, distinctions are made between bias, harmonics, FOV error, and white noise. The impacts of these various time categories on the performance of the attitude-determining subassembly are different. In particular, gyrostellar filtering serves to reduce the impact of the "noise" category. The harmonic category is essentially of thermoelastic origin, and its impact can be limited by controlling the temperature environment of the sensor. The bias category has small impact insofar as calibration means can be implemented.

The FOV error of a star sensor has greatest impact on performance in determining the attitude of such a star sensor or of the spacecraft on which it is mounted. This leads to specifications being issued that are quite severe concerning star sensors and for which there has been no response until now. Indeed specifications have been relaxed in order to comply with that which is available.

In this context, analysis of results shows that FOV error can be assumed to be 10 microradians ($\mu$rad) in a configuration comprising 3 FOGs+3 standard star trackers (SSTs), which error can be reduced to 6 $\mu$rad by the gyrostellar estimator filter. This error, combined quadratically with other factors, gives rise to an overall attitude and orbit control system (AOCS) end result of 11 $\mu$rad, for an allocation of 13 $\mu$rad. Configurations with 2 or 1 SSTs lead to degraded performance. These observations have been confirmed by statistical results obtained from simulations, and have led to a present tightening of FOV error specifications as issued to the suppliers of star sensors.

FOV errors lead to phenomena such as incomplete knowledge of and fluctuation in focal length, distortion calibration residues, chromatic aberrations, and errors in knowledge about the absolute positions of stars (catalog errors, relativistic correction residues). They lead to errors in measuring the position of each star in the focal plane, said errors being of amplitudes and directions that vary as a function of the position of the star in the field of view. Wide-angle star sensors track a large number of stars simultaneously (typically in the range about ten to a few tens). The resulting attitude measurement error depends on the distribution of stars in the field of view and on the way it varies over time under the effect of the angular speed of the carrying satellite.

In the context of geocentric pointing, and particularly for a satellite that is maneuvering, induced determination error can be modeled as noise filtered by a lowpass filter-having a time constant associated with the mean time taken by a star to pass through the field of view. Because of the resulting relatively large time constants that stem therefrom (about 100 seconds), such noise is difficult to reduce by the attitude estimator filter which combines star measurements with gyro measurements.

With inertial pointing (e.g. solar pointing), this substantially constant measurement error is no longer filtered at all by the attitude estimator algorithm.

Furthermore, such a model of field of view errors is somewhat theoretical, and complete simulations associating fine modeling of the sensor with dynamic modeling would be needed to quantify such errors more precisely.

In parallel, it therefore appears appropriate to pursue lines of investigation that enable this source of error to be reduced without impact on the hardware architecture of existing sensors, for example by means of an inline calibration algorithm.

SUMMARY OF THE INVENTION

The invention seeks to reduce the amplitude of FOV errors in attitude-estimation methods.

The invention achieves this object by a method of determining the attitude of a spacecraft, the method comprising the steps consisting in:

a) sensing the projections of a plurality of stars on an optical star sensor mounted on the spacecraft;

b) providing a reference focal length for said sensor, said focal length serving to convert the projections of the stars as picked up on the sensor into sensor-star directions in a frame of reference associated with the sensor; and c) determining the angular values of the attitude of the spacecraft relative to the stars by solving a system of equations which has as its input data in particular the projections of the stars on the sensor and the reference focal length of the sensor;

the method being characterized by introducing, as unknowns in the system of equations, at least one parameter defining a series of focal length errors, each of which errors has an influence on converting the projection of a respective star into the corresponding sensor-star direction; and in step c), by determining said parameter(s) simultaneously with determining the values for the attitude angles of the spacecraft;

in such a manner that taking said focal length error parameter(s) into account as unknowns in the system reduces the uncertainty introduced by incomplete knowledge of these errors on the results for the values of the attitude angles of the spacecraft.

The invention also provides an apparatus for determining the attitude of a spacecraft using an optical star sensor, the apparatus including such an optical star sensor arranged to sense the projections of a plurality of stars on said sensor. The apparatus further comprises calculation means suitable for determining the values of attitude angles of the spacecraft relative to the stars by solving a system of equations having as its inputs specifically the projections of the stars on the sensor and also a reference focal length of the sensor, said focal length serving to convert the star projections into sensor-star directions in a frame of reference associated with the sensor, the apparatus being characterized in that the calculation means are arranged to take account of one or more parameters defining a series of focal length errors as one or more additional parameters in the system of equations, each of which errors has an influence on converting the projection of a respective star into the corresponding sensor-star direction, the calculation means being arranged to determine said parameter(s) defining a series of focal length errors simultaneously with determining the values for the attitude angles of the spacecraft.

Other characteristics, objects, and advantages of the invention will appear on reading the following detailed description made with reference to the accompanying figures, in which:

BRIEF DESCRIPTION OF THE DRAWINGS

FIGS. 33a to 33f show results obtained with distortion errors that are five times greater;

DETAILED DESCRIPTION OF THE DRAWING

Typical assumptions on the characteristics of a star sensor are those given below, in order to evaluate the proposed algorithm under representative conditions:
field of view 25°×25°;
focal length 30 centimeters (cm);
number of stars tracked: ten;
measurement errors for one star:
noise: 37" at three standard deviations (3σ);
focal length fluctuation: 1.5"/K at the edge of the field with a temperature environment that is stable to within ±2° C.;
distortion residue: 9" at 3σ;
chromatic aberrations: 3" at 3σ; and
catalog errors: 0.3" at 3σ.

In the description below, a preferred implementation of the invention is evaluated by means of simulations performed in the context of this study by using a tool for simulating a measurement error function of an instrument. The tool is known as COROT, it has been developed by the Applicant, and it makes it possible to represent the following:
the designation in position and magnitude of stars present in the field of view;
the fluctuation of real attitude about an inertial pointing reference;
the measured positions of the stars on the detector, taking account of various sources of error; and
the attitude-determining algorithm.

Amongst possible sources of error, account is taken of the following:
noise in measuring the center of gravity of the star spot, with standard deviation that depends on magnitude;
interpolation errors;

fluctuation over time in focal length at the center of the field (non-centered harmonic model); and the distortion that is specific to each star as a function of its position in the field, and that is represented as a focal length value.

Figure 1:
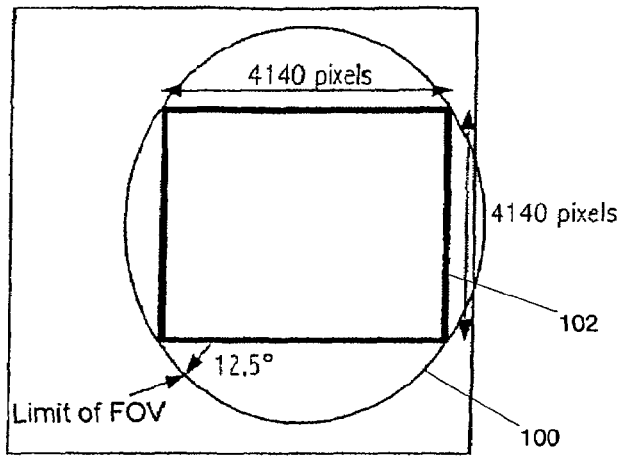
FIG. 1 shows a field of view facing a detector used for implementing the invention.

Attempts have been made to minimize modifications to the tool. In addition to installing the proposed algorithm, these modifications have consisted mainly in taking account of certain items of configuration data such as the size of the field of view, focal length, and error parameters. In particular, the number of pixels on the detector has been kept identical to that of the COROT case (4140×4140) so as to avoid modifying interfaces with the input catalog, in which the reference positions of stars are defined in pixels. The field of view 100 is defined as being the circle in which the detector 102 is inscribed, as shown in FIG. 1. This leads to a "virtual" pixel of size 22.71 μm, i.e., 15.37". The field of view and the focal length are the values defined in paragraph 2.

Inertial pointing operation on a predefined field was maintained, thereby facilitating interpretation of the effects of errors and algorithms compared with circumstances in which the stars move through the field of view. For the same reason, account is taken of incomplete knowledge concerning focal length at the center of the field that remains constant over time.

With star sensors, the error due to distortion is associated with a calibration residue for which no assumption is available concerning distribution over the field. It has been assumed that it is distributed randomly over the field, in application of a relationship that is uniform between 0 and the maximum calculated as follows.

Nevertheless, it may be assumed that the effect of distortion residues and incomplete knowledge concerning focal length is greater at the edge of the field. The relationship providing a first-order connection between fluctuation in focal length df and measurement error at the edge of the field dθ is:

$$df = \frac{2 \cdot f}{FOV} \cdot d\theta$$

Account is thus taken of thermoelastic fluctuation in the focal-length of 10 μm per kelvin, and a maximum value for the distortion of 60 μm.

No account was taken of interpolation error, and for simplification purposes, each star had position measurement noise allocated thereto that was distributed quadratically along two axes, giving a standard deviation of 9" or 0.6 pixels per axis, regardless of its magnitude.

There follows a description of a preferred method of estimating the attitude of a sensor or a spacecraft on which it is mounted (in this case a satellite).

A three-dimensional frame of reference associated with the sensor is defined as follows:

Zs is the normal to the detector going into space;

Xs and Ys lie in a plane parallel to the plane of the detector as defined by the above scheme.

Figure 2:
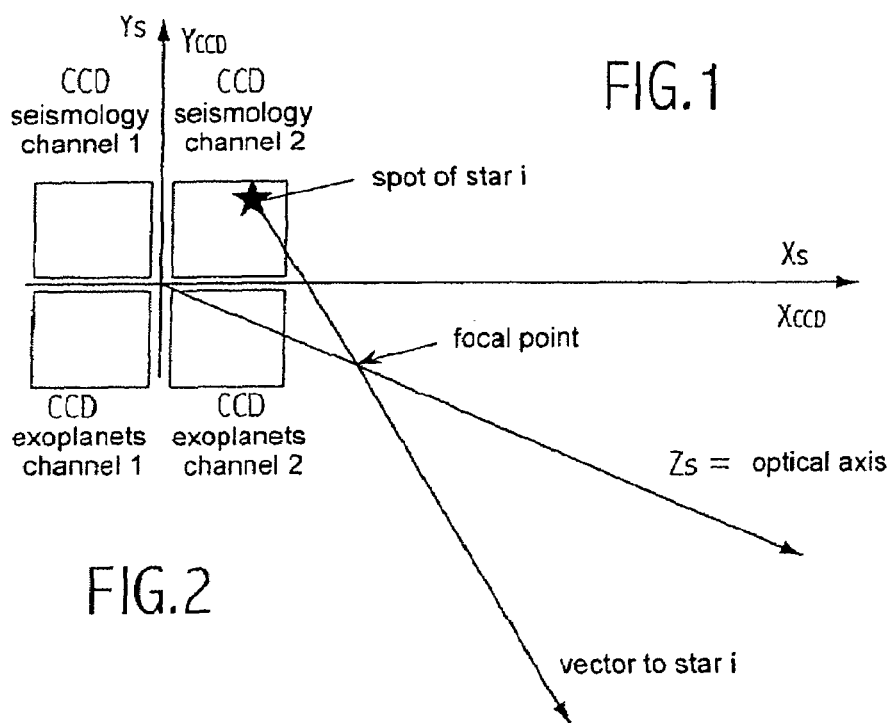
FIG. 2 shows reference points used for implementing measurements and calculation steps in a preferred method of implementing the method.

Also defined (see FIG. 2) is a two-dimensional frame of reference associated with the detector, having its origin at the point of intersection between the optical axis and the plane of the detector. The axes $X_{CCD}$ and $Y_{CCD}$ are respectively parallel to Xs and Ys.

Each star given an index i is associated with a reference vector Vi normed in the sensor frame of reference. For a reference focal length at the center of the field $f_{ref}$, this vector Vi is defined as follows, from the reference position $(x_i, y_i)$ of the star in the detector frame of reference.

The following apply:

$$V_i = \begin{pmatrix} vix \\ viy \\ viz \end{pmatrix} \quad x_i = f_{ref} \cdot \frac{V_i \cdot X_s}{V_i \cdot Z_s} = \frac{vix}{viz} \text{ and } y_i = f_{ref} \cdot \frac{V_i \cdot Y_s}{V_i \cdot Z_s} = \frac{viy}{viz}$$

and also:

$$V_i = \frac{1}{\sqrt{1 + \left(\frac{x_i}{f_{ref}}\right)^2 + \left(\frac{y_i}{f_{ref}}\right)^2}} \begin{pmatrix} \frac{x_i}{f_{ref}} \\ \frac{y_i}{f_{ref}} \\ 1 \end{pmatrix}$$

The "reference" frame of reference of the sensor Rc is such that in this frame of reference the directions of the stars being tracked coincide with the vectors Vi. The real frame of reference of the sensor Rs is such that the directions of the target stars in the sensor frame of reference become vectors Wi. Determining attitude consists in estimating the angular differences between the real frame of reference of the sensor and its reference frame of reference.

The following rotation convention is defined:

$$R_c \xrightarrow{\psi \overline{Z}_c} R' \xrightarrow{\theta Y'} R'' \xrightarrow{\phi \overline{X}''} R_s$$

Wi can be expressed as a function of Vi as follows:

$$Wi = \begin{pmatrix} \cos\psi\cos\theta & \sin\psi\cos\theta & -\sin\theta \\ \cos\psi\sin\theta\sin\varphi - \sin\psi\cos\varphi & \sin\psi\sin\theta\sin\varphi + \cos\psi\cos\varphi & \cos\theta\sin\varphi \\ \cos\psi\sin\theta\cos\varphi + \sin\psi\sin\varphi & \sin\psi\sin\theta\cos\varphi - \cos\psi\sin\varphi & \cos\theta\cos\varphi \end{pmatrix} \cdot Vi$$

In the absence of measurement error, the ideal measurements associated with Wi are as follows:

$$xm_i = f_{ref} \cdot \frac{W_i \cdot X_s}{W_i \cdot Z_s} \text{ and } ym_i = f_{ref} \cdot \frac{W_i \cdot Y_s}{W_i \cdot Z_s}$$

The components of Wi can be reconstructed from these measurements as follows:

$$W_i = \frac{1}{\sqrt{1 + \left(\frac{xm_i}{f_{ref}}\right)^2 + \left(\frac{ym_i}{f_{ref}}\right)^2}} \begin{pmatrix} \frac{xm_i}{f_{ref}} \\ \frac{ym_i}{f_{ref}} \\ 1 \end{pmatrix}$$

The link between the position of the star on the detector and the associated vector in sensor axes thus relies on knowledge of a focal length.

The focal length ($f_{ref}$) thus serves to transform the coordinates of an optical projection of a star ($xm_i, ym_i$), which projection is obtained on a projection surface of the sensor, into a sensor-star direction relative to the sensor (Wi).

The least squares method relies on linearizing measurement equations about the reference. It is then assumed that the angles $\phi$, $\theta$, $\Psi$ are small relative to 1, giving, to the first order:

$$Wi \approx \begin{pmatrix} 1 & \psi & -\theta \\ -\psi & 1 & \varphi \\ \theta & -\varphi & 1 \end{pmatrix} \cdot Vi$$

Thus, still to the first order:

$$\frac{xm_i}{f_{ref}} = -\frac{vix + \psi \cdot viy - \theta \cdot viz}{viz + \theta \cdot vix - \varphi \cdot viy}$$

$$\approx -\left(\frac{vix}{viz} + \varphi \cdot \frac{vix \cdot viy}{viz^2} - \theta \cdot \left(1 + \frac{vix^2}{viz^2}\right) + \psi \cdot \frac{viy}{viz}\right)$$

$$\frac{ym_i}{f_{ref}} = -\frac{viy - \psi \cdot vix + \varphi \cdot viz}{viz + \theta \cdot vix - \varphi \cdot viy}$$

$$\approx -\left(\frac{viy}{viz} + \varphi \cdot \left(1 + \frac{viy^2}{viz^2}\right) - \theta \cdot \frac{vix \cdot viy}{viz^2} - \psi \cdot \frac{vix}{viz}\right)$$

Whence, for each target, two measurement equations:

$$\Delta_i = \begin{pmatrix} \frac{xm_i - x_i}{f_{ref}} \\ \frac{ym_i - y_i}{f_{ref}} \end{pmatrix} = \begin{pmatrix} \frac{vix \cdot viy}{viz^2} & -\left(1 + \frac{vix^2}{viz^2}\right) & \frac{viy}{viz} \\ \left(1 + \frac{viy^2}{viz^2}\right) & -\frac{vix \cdot viy}{viz^2} & -\frac{vix}{viz} \end{pmatrix} \cdot \begin{pmatrix} \varphi \\ \theta \\ \psi \end{pmatrix} = J_i \cdot \begin{pmatrix} \varphi \\ \theta \\ \psi \end{pmatrix}$$

By combining the equations associated with n targets, it is thus possible to construct the Jacobian matrix J of dimension 2n×3 such that:

$$\begin{pmatrix} \vdots \\ \Delta_i \\ \vdots \end{pmatrix} = \begin{pmatrix} \vdots \\ J_i \\ \vdots \end{pmatrix} \cdot \begin{pmatrix} \varphi \\ \theta \\ \psi \end{pmatrix} = J \cdot \begin{pmatrix} \varphi \\ \theta \\ \psi \end{pmatrix}$$

In the presence of measurement errors, this set of linear equations is solved by the least squares method. The solution which minimizes the following criterion:

$$C = \sum_i \left(\left(\frac{xm_i - x_i}{f_{ref}}\right)^2 + \left(\frac{ym_i - y_i}{f_{ref}}\right)^2\right)$$

is given by:

$$\begin{pmatrix} \varphi \\ \theta \\ \psi \end{pmatrix} = \left[\sum_i (\cdots J_i^T \cdots) \cdot \begin{pmatrix} \vdots \\ J_i \\ \vdots \end{pmatrix}\right]^{-1} \cdot \sum_i \left((\cdots J_i^T \cdots) \cdot \begin{pmatrix} \vdots \\ \Delta_i \\ \vdots \end{pmatrix}\right)$$

It is also possible to introduce weighting for the variations measurements. In particular, for a given star, it is possible to envisage different weights $\sigma x_i$ and $\sigma y_i$ on the x and y measurements. Under such circumstances, the solution is provided by the same equation, in which the following formal replacements are made:

$$\frac{xm_i - x_i}{f_{ref}} \text{ by } \frac{xm_i - x_i}{f_{ref} \cdot \sigma x_i} \text{ and } \frac{ym_i - y_i}{f_{ref}} \text{ by } \frac{ym_i - y_i}{f_{ref} \cdot \sigma y_i}$$

Finally, it is also possible to use this method in iterative manner.

Work performed by the Applicant on defining a measurement error function for an instrument known as COROT has shown that this method gives results that are similar to those obtained by a QUEST type algorithm without linearization, even in the presence of pointing errors, and that iterations do not provide any particular advantage.

The work carried out on COROT has shown that it is possible to reduce significantly the impact of uncertainty concerning focal length on attitude measurement error. The means for doing this consist in formulating attitude measurement equations internal to the sensor, which equations include focal length uncertainty as an unknown. This is possible so long as the number of equations (equal to twice the number of measured stars) remains greater than or equal to the number of unknowns (i.e. 4 for small angles). This assumes that approximate knowledge is available concerning attitude (for example the reference attitude for a guided satellite). This also assumes that measurements can be processed for each star.

The method has been evaluated by simulation and has given results that are very satisfactory for two or more tracked stars.

To do this, starting from the above-described method, it is possible to include additional unknowns such as fluctuation in focal length, by appropriately adapting the measurement equations.

$\delta fsf$ is defined as follows:

$$\delta fsf = \frac{f_v - f_{ref}}{f_{ref}}$$

or indeed:

$$f_v = f_{ref}(1 + \delta fsf)$$

Assuming that $\phi$, $\theta$, $\psi$, and $\delta fsf$ are small compared with 1, the following equations are established for each star:

$$\Delta_i = \begin{pmatrix} \frac{xm_i - x_i}{f_{ref}} \\ \frac{ym_i - y_i}{f_{ref}} \end{pmatrix}$$

$$= \begin{pmatrix} \frac{vix \cdot viy}{viz^2} & -\left(1 + \frac{vix^2}{viz^2}\right) & \frac{viy}{viz} & \frac{vix}{viz} \\ \left(1 + \frac{viy^2}{viz^2}\right) & -\frac{vix \cdot viy}{viz^2} & -\frac{vix}{viz} & \frac{viy}{viz} \end{pmatrix} \cdot \begin{pmatrix} \varphi \\ \theta \\ \psi \\ \delta fsf \end{pmatrix}$$

$$= J_i \cdot \begin{pmatrix} \varphi \\ \theta \\ \psi \\ \delta fsf \end{pmatrix}$$

Combining the equations associated with the set of N stars enables the Jacobian matrix J of dimension 2N×4 to be constructed, and enables the linear system to be solved by the least squares method.

An extension to this algorithm is proposed herein covering estimating the focal length specific to each star (i.e. distortion).

If it is considered that distortion is equivalent to a dispersion in focal length over the field of view (generally as an increasing function of distance from the center of the field), the above method can be extended to each star. The vector of the unknowns is then of dimension 3+N:

Each star is associated with a local value for focal length $f_i$, and $\delta fsf_i$ is defined as follows:

$$\delta fsf_i = \frac{f_i - f_{ref}}{f_{ref}}$$

Each tracked-star enables the following measurement equations to be established:

$$\Delta_i = \begin{pmatrix} \frac{xm_i - x_i}{f_{ref}} \\ \frac{ym_i - y_i}{f_{ref}} \end{pmatrix}$$

$$= \begin{pmatrix} \frac{vix \cdot viy}{viz^2} & -\left(1 + \frac{vix^2}{viz^2}\right) & \frac{viy}{viz} & 0 \ldots 0 & \frac{vix}{viz} & 0 \ldots 0 \\ \left(1 + \frac{viy^2}{viz^2}\right) & -\frac{vix \cdot viy}{viz^2} & -\frac{vix}{viz} & 0 \ldots 0 & \frac{viy}{viz} & 0 \ldots 0 \end{pmatrix} \cdot \begin{pmatrix} \varphi \\ \theta \\ \psi \\ \vdots \\ \delta fsf_i \\ \vdots \end{pmatrix}$$

$$= J_i \cdot \begin{pmatrix} \varphi \\ \theta \\ \psi \\ \vdots \\ \delta fsf_i \\ \vdots \end{pmatrix}$$

Combining the equations associated with the set of N stars enables the Jacobian matrix J of dimensions (2N)×(3+N) to be constructed, and enables the linear system to be solved by the least squares method.

At least three stars are necessary in order to have as many-equations as there are unknowns.

Since this method relies on geometrical modeling, it can be expected that it also makes it possible to reduce all of the errors compatible with the model (radial coupling between axes in the focal plane).

Nevertheless, this method has the drawback of requiring a matrix to be inverted, where the dimension of the matrix increases with the number of stars observed, being (3+N)×(3+N).

Using the assumptions and the tools described above, the effects of this method of determining attitude are studied in the manner described below.

Initially the description is restricted to the specific case of a configuration of stars in the field of view under inertial pointing. The time signature in attitude of the various errors at star level, i.e. noise, incomplete knowledge concerning focal length at the center of the field, and distortion residue, is validated for a conventional attitude estimation algorithm.

Then the contribution of algorithms for estimating focal length and distortion is shown.

Finally, the advantages and the limits of the algorithm using distortion estimates are evaluated by analyzing robustness.

Figure 3:
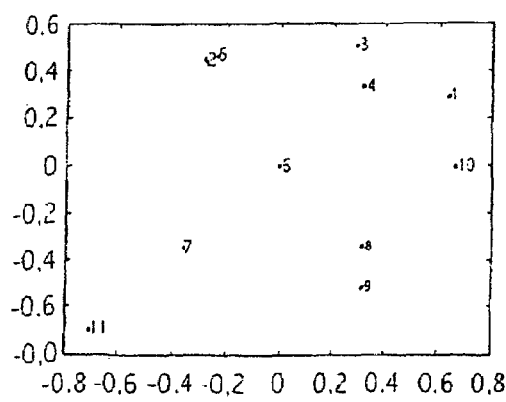
FIG. 3 shows a field of twelve stars used for analyzing the effects of the method of the invention.

To begin with, the analysis is carried out on a field of 12 stars having the distribution in the field as shown in FIG. 3. It is recalled that these stars remain stationary in the field of view throughout the simulation.

In order to identify the effects of various errors and to validate the approach, we begin by examining the behavior of the simple algorithm for determining attitude by the least squares method. Work carried out on COROT has shown that this algorithm can be considered as a "conventional" algorithm, giving results that are equivalent to those obtained by the QUEST method. Simulations were carried out on about 12,600 shots.

It has thus been verified that with inertial pointing and a conventional algorithm, the effect of time noise on measuring star positions does indeed lead to noise in attitude estimation, and that so-called "field of view" errors lead to bias.

Figure 4:
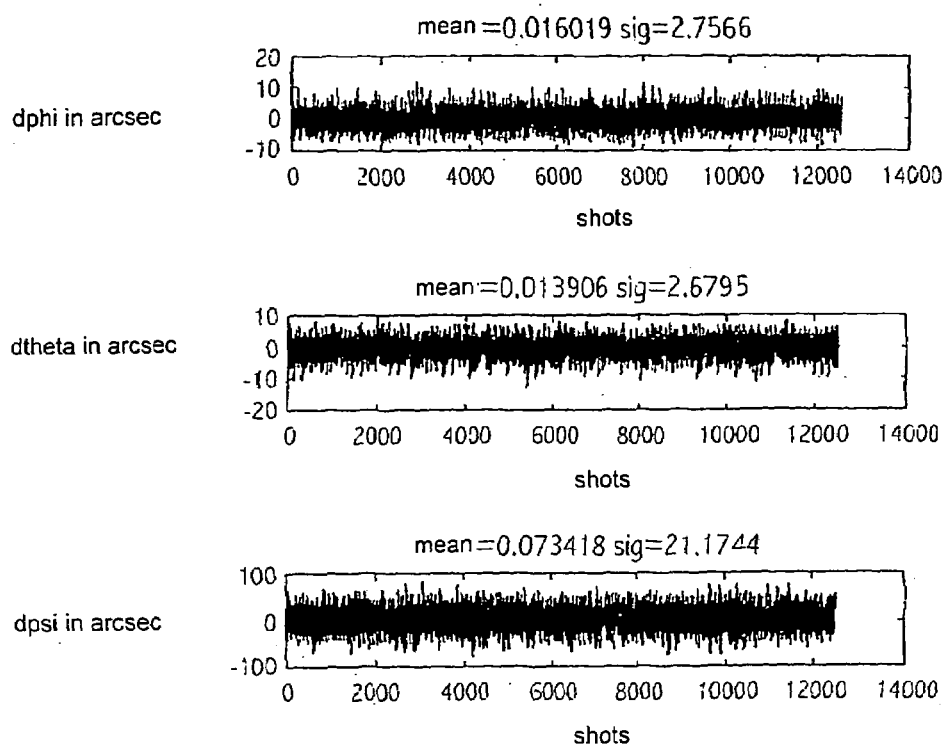
FIG. 4 shows the effects of noise on the results of attitude estimation using a conventional method.

For each shot, noise was added in application of a Gaussian relationship. The effect of measurement noise on its own is shown in FIG. 4. The resulting attitude noise is practically centered (mean of about 100th of a second of arc), with a standard deviation on the cross axes of about 2.7".

On applying the following multiplying factors:
$\sqrt{12}$ associated with the number of stars; and
$\sqrt{2}$ associated with combining two cross axes;

to go from 1σ to 3σ, a value of 39" is indeed found which is close to the measurement noise value used as an initial assumption at star level.

Figure 5:
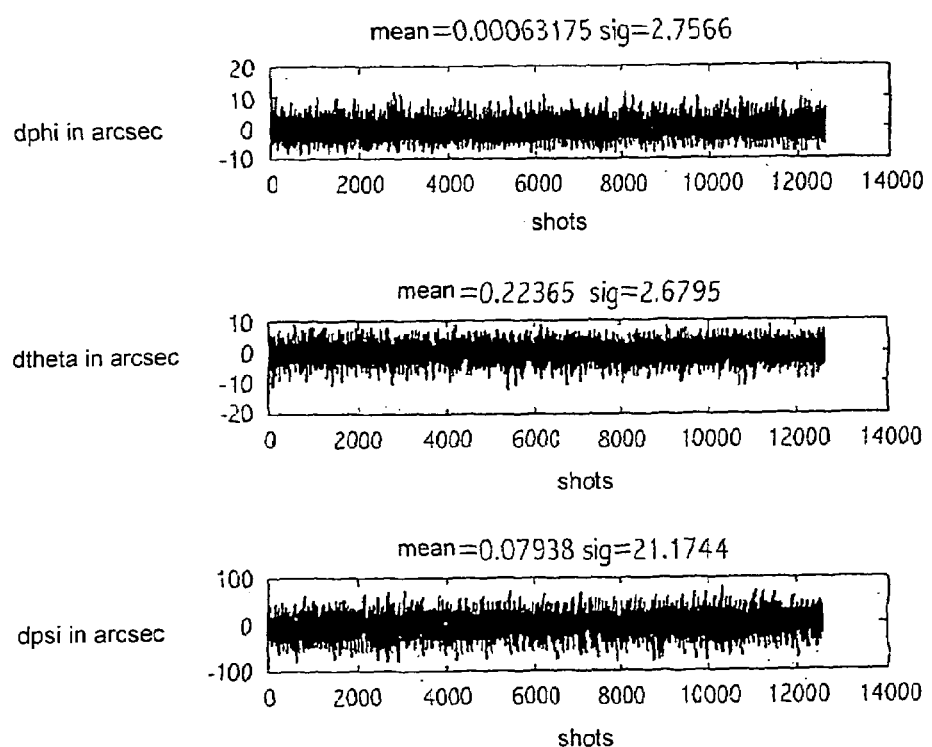
FIG. 5 shows the effects of noise and of incomplete knowledge of focal length on the results of a conventional method.

Error concerning knowledge about focal length is applied to the entire simulation. The results are shown in FIG. 5. It does not affect standard deviation, but, as could be expected with inertial pointing, it does lead to perceptible bias on the cross axis (in this case dtheta). The link between the value u bias and incomplete knowledge concerning focal length depends on the configuration of the stars in the field.

Figure 6:
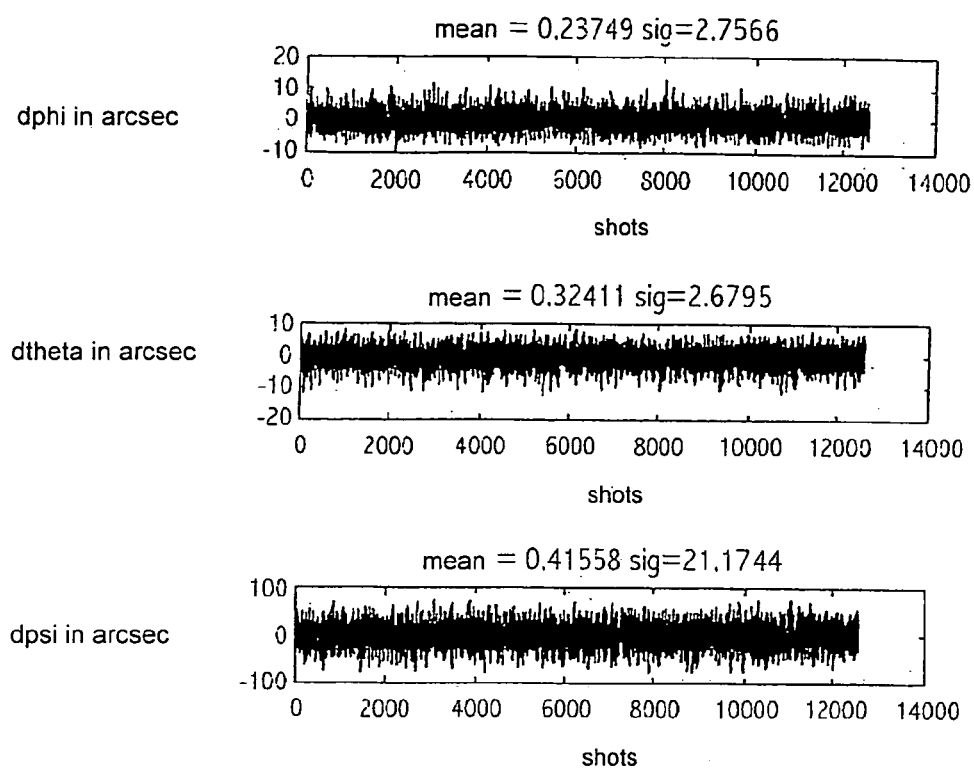
FIG. 6 shows the effects of noise, of incomplete knowledge of focal length, and of distortion at the center of the field on the results obtained with a conventional method.

The effect of the distortion is shown in FIG. 6. The same typical errors are observed as with "noise only", but as expected, in this case also there can be seen relatively large amounts of bias on all three axes, as a function of the distortion local to each star and as a function of the configuration of the stars in the field.

Figure 7:
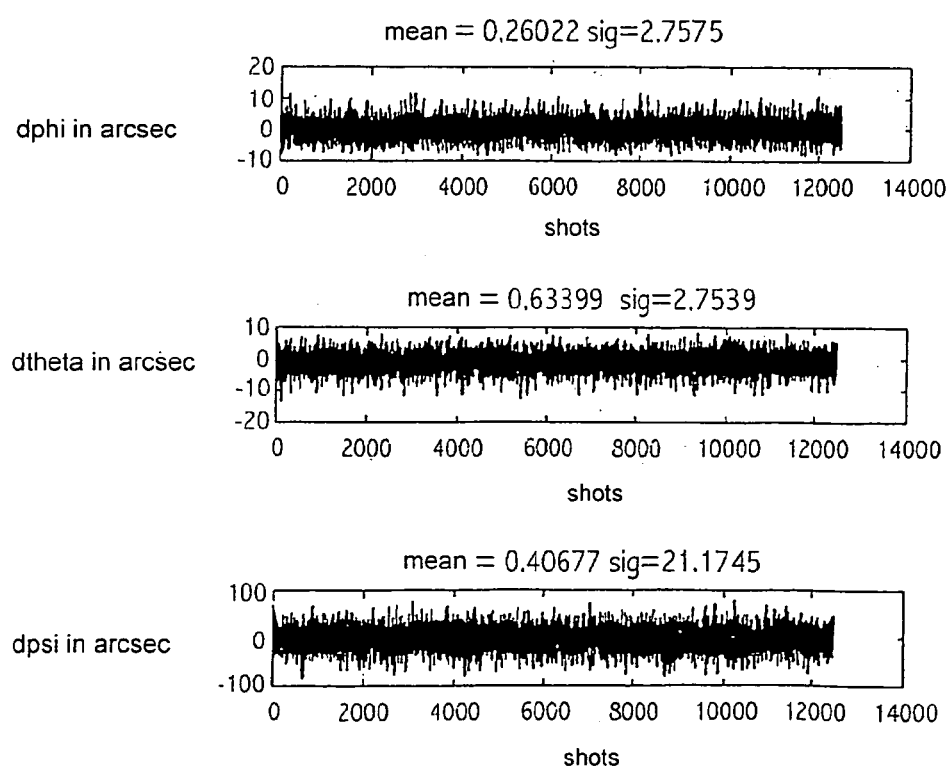
FIG. 7 shows the effects of the same errors on the results of a method that includes estimating focal length at the center of the field.

FIG. 7 shows the results of determining attitude using the same errors as above (noise, incomplete knowledge concerning focal length and distortion, and with all shots reproduced identically), and with the algorithm that includes focal length in the vector of unknowns, as described above.

The standard deviations remain unchanged, but bias can be seen to vary, mostly getting worse. This is attributed to the relative importance of distortion compared with incomplete knowledge about focal length in this simulation.

Thermoelastic fluctuation in focal length is of little importance in terms of distortion residue, given the relatively accurate control over the temperature environment of the sensor. Such an algorithm is thus of some advantage but it would be desirable to improve it.

Figure 8:
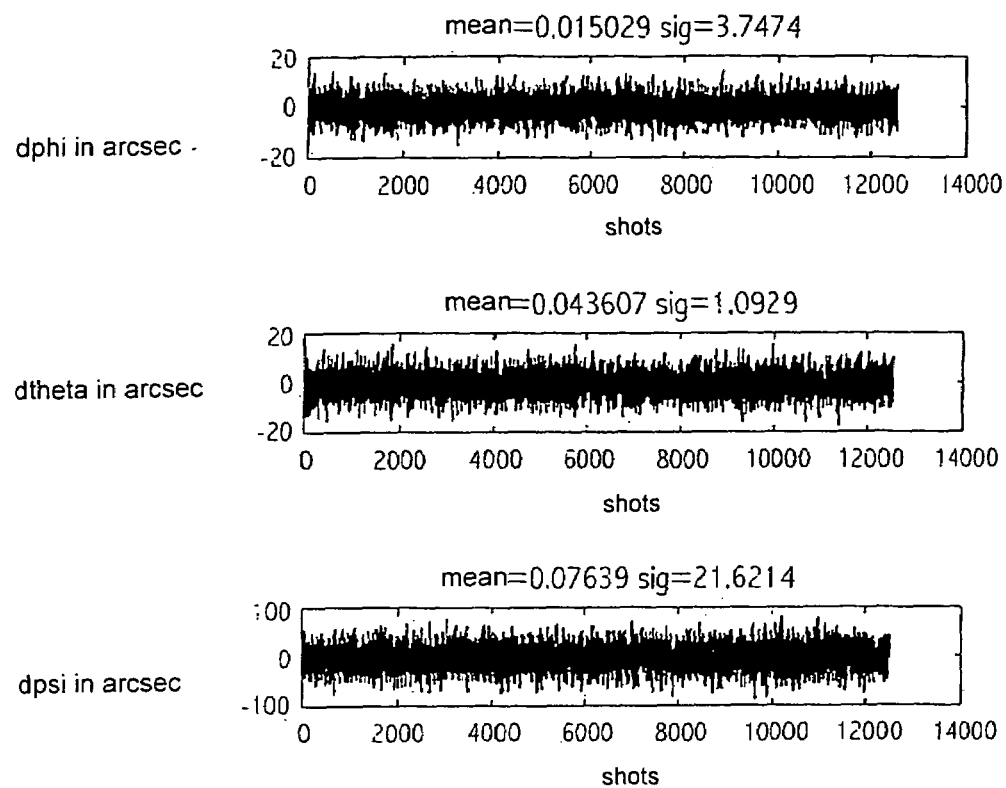
FIG. 8 shows the effects of an algorithm with distortion being estimated in accordance with the invention.

FIG. 8 shows the effects of the algorithm in which distortion is estimated.

There can be seen a clear reduction in bias compared with estimating attitude alone, bias being reduced to a level comparable with that observed with noise type errors only. However standard deviations are degraded by a factor of under 2.

Nevertheless, the attitude estimation noise introduced by the SSTs is well filtered by the gyrostellar estimator. This approach which reduce the impact of FOV errors to the detriment of noise thus essentially has a clear advantage.

It is desirable to multiply star fields in order to assess the behavior of the algorithm in the presence of different configurations of stars. It is then desirable to study robustness, and in particular:

in the face of pointing error (insofar as the method relies on linearizing measurement equations about a reference attitude);

in the face of assumptions about the relative weight of distortion-compared with measurement noise; and in the face of other sources of FOV error.

The simulations were repeated for 100 configurations of stars. In each case, the positions of ten stars in the field of view were drawn randomly in application of a uniform relationship, as was the associated distortion residue. In order to reduce the time required for stimulation, the number of shots on which bias and standard deviation were evaluated was reduced to 6000.

Figure 9:
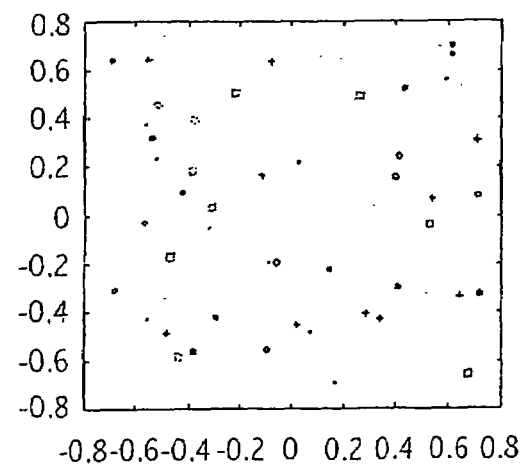
FIG. 9 shows a plurality of star configurations used for testing a preferred method of the invention.
Figure 10A:
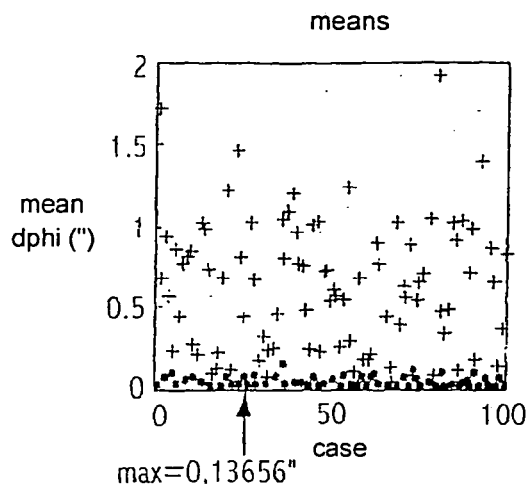
FIGS. 10a to 10f show results obtained with and without the method of the invention in the various different star configurations.
Figure 10B:
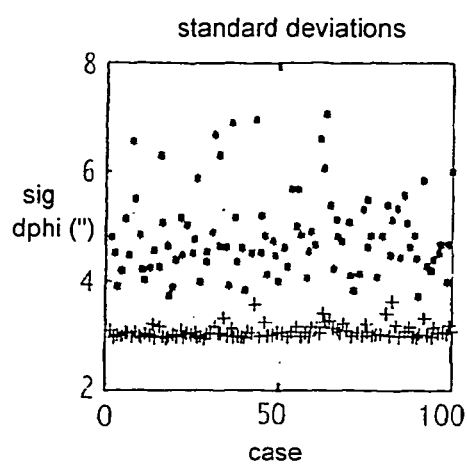
Figure 10C:
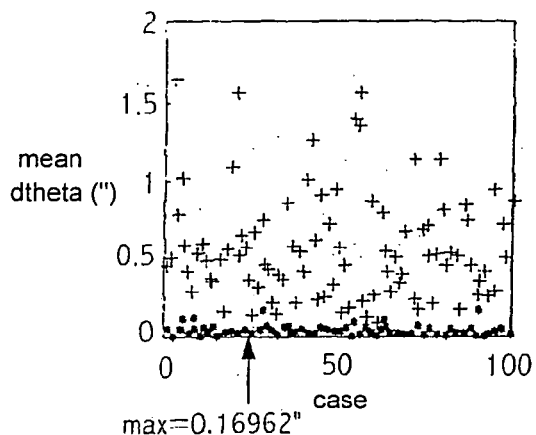
Figure 10D:
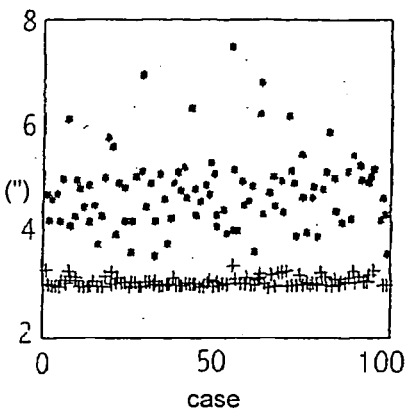
Figure 10E:
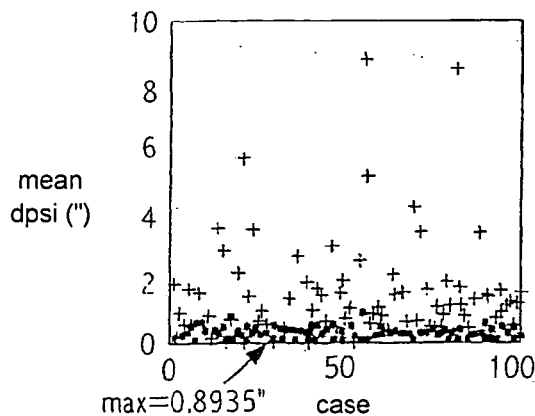
Figure 10F:
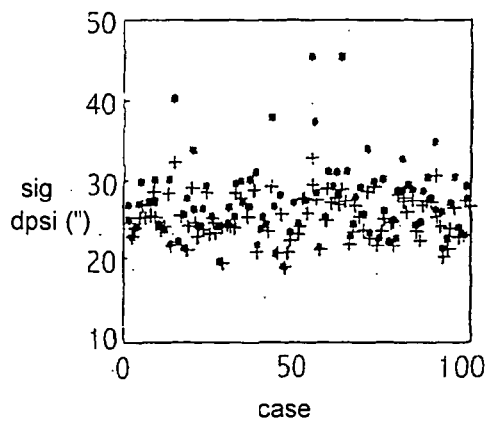
Figure 11A:
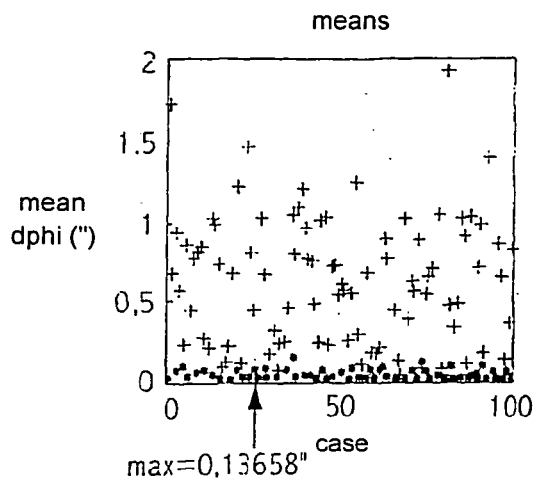
FIGS. 11a to 11f show results obtained with and without the method of the invention in making estimates of pointing errors.
Figure 11B:
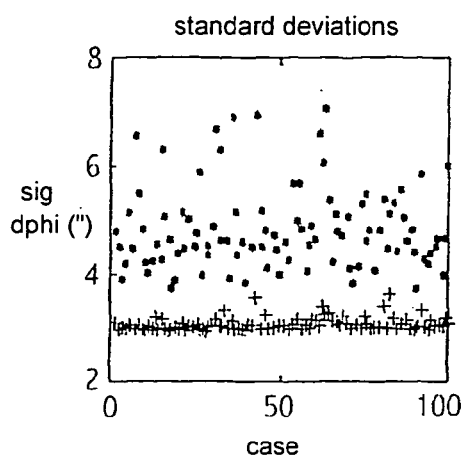
Figure 11C:
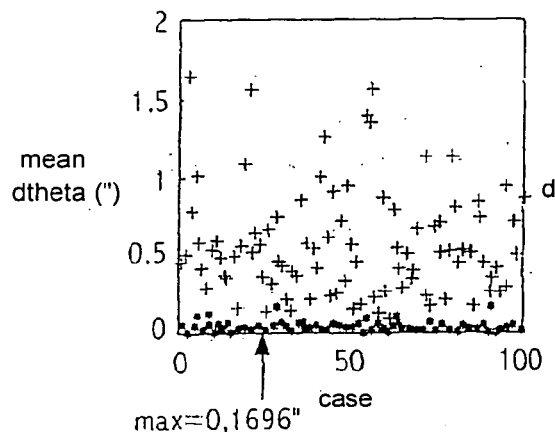
Figure 11D:
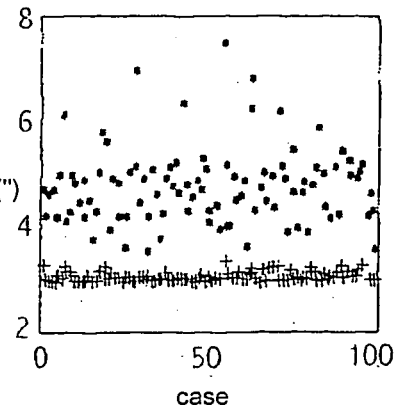
Figure 11E:
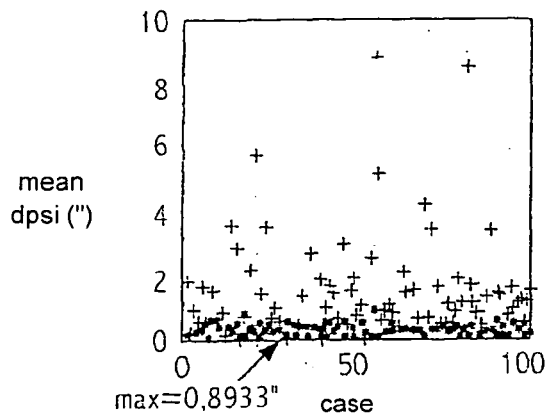
Figure 11F:
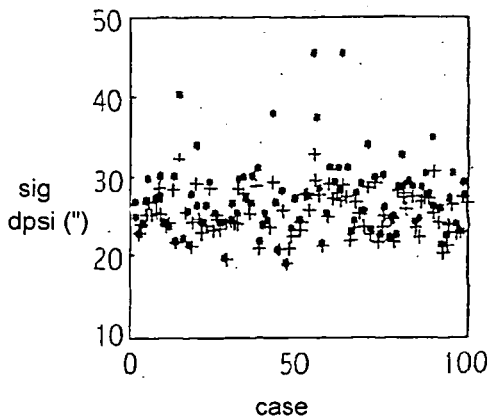
Figure 12A:
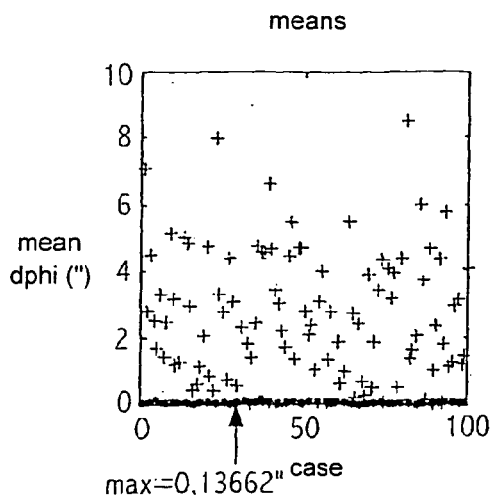
FIGS. 12a to 12f show results obtained with greater distortions.
Figure 12B:
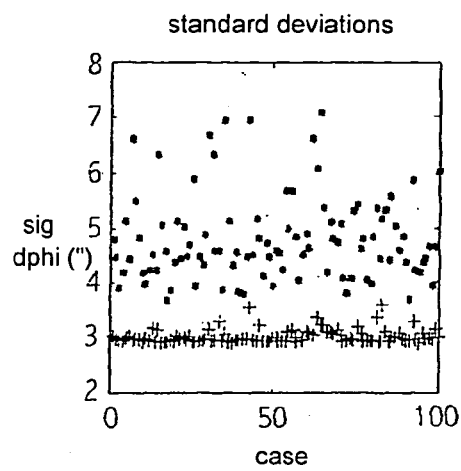
Figure 12C:
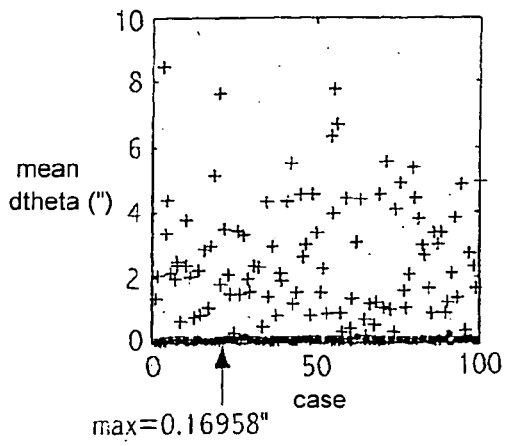
Figure 12D:
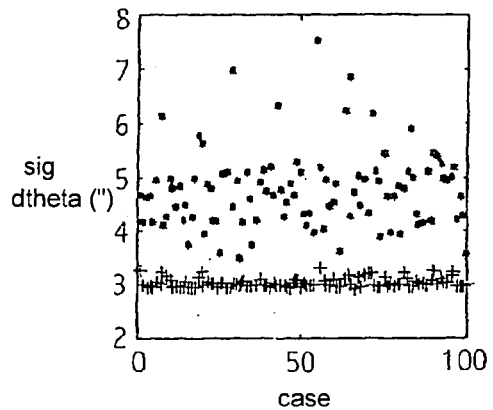
Figure 12E:
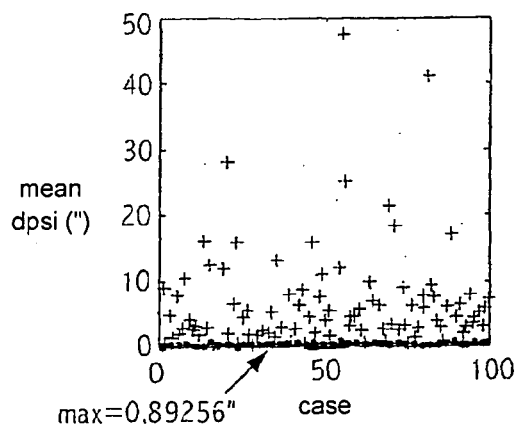
Figure 12F:
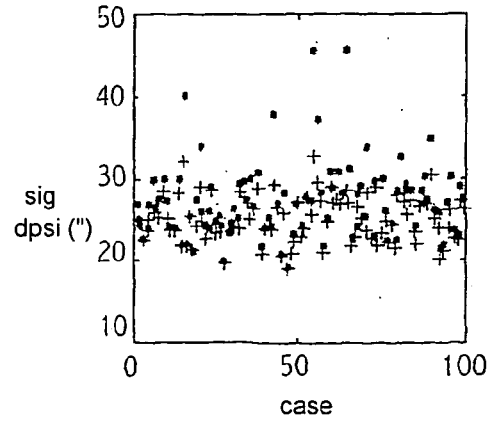
Figure 13A:
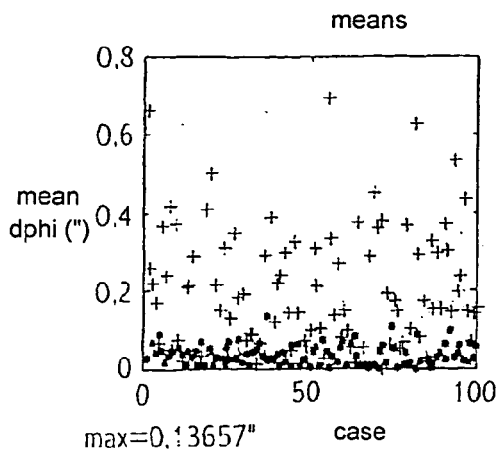
FIGS. 13a to 13f show results obtained with smaller distortions.
Figure 13B:
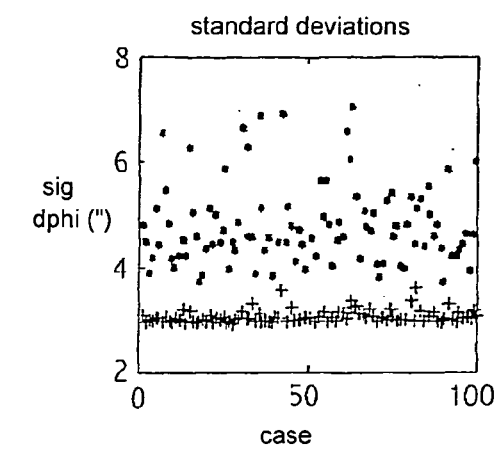
Figure 13C:
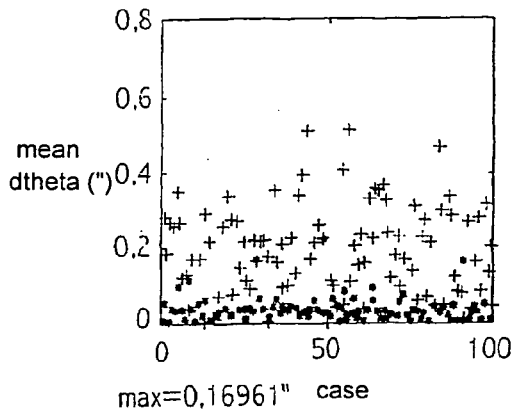
Figure 13D:
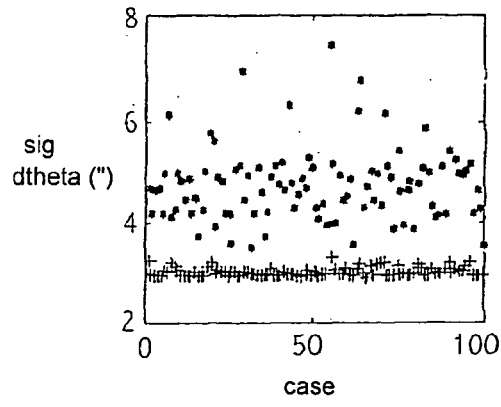
Figure 13E:
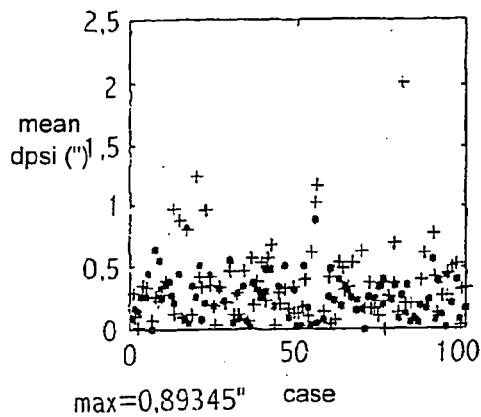
Figure 13F:
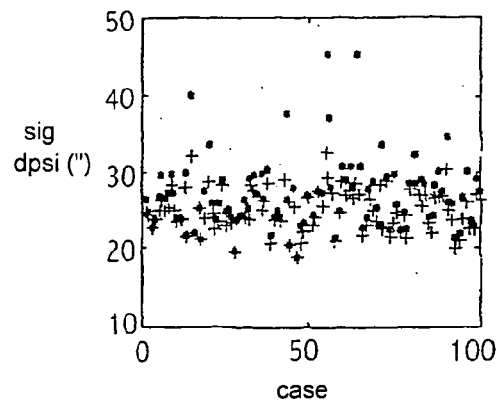
Figure 14A:
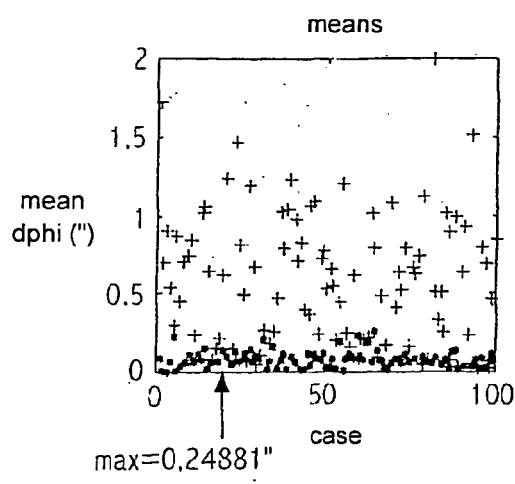
FIGS. 14a to 14f show results obtained with non-radial errors having an amplitude of 0.3"
Figure 14B:
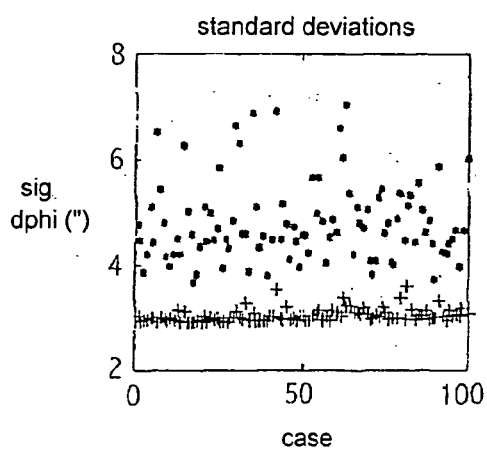
Figure 14C:
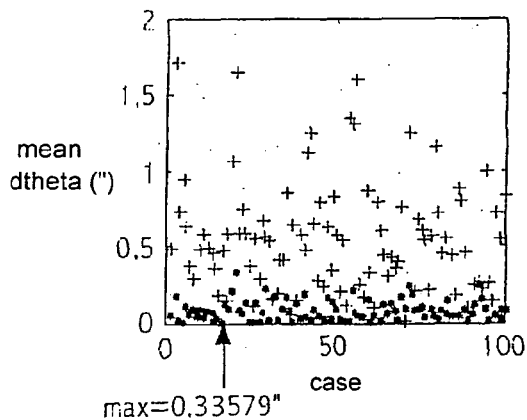
Figure 14D:
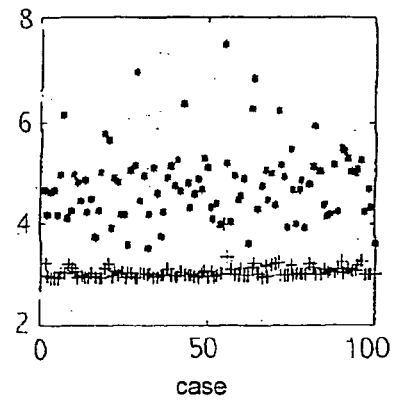
Figure 14E:
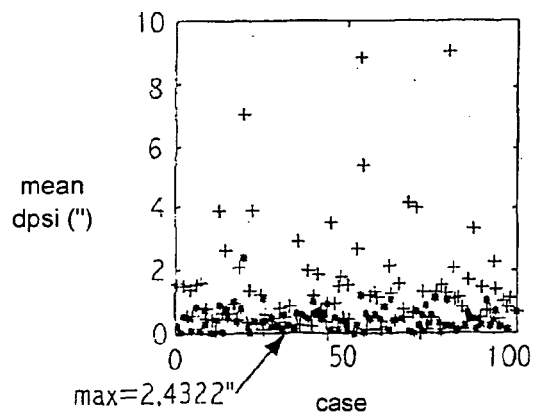
Figure 14F:
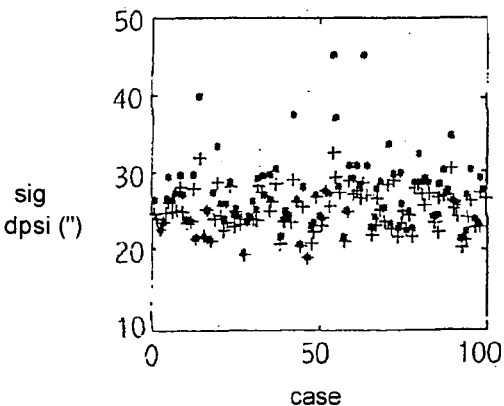
Figure 15A:
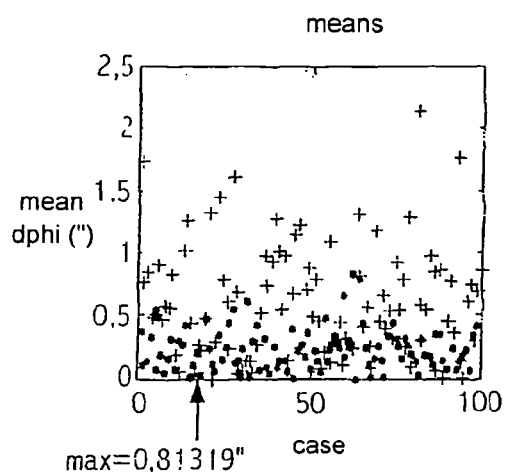
FIGS. 15a to 15f show results obtained with non-radial errors having an amplitude of 1"
Figure 15B:
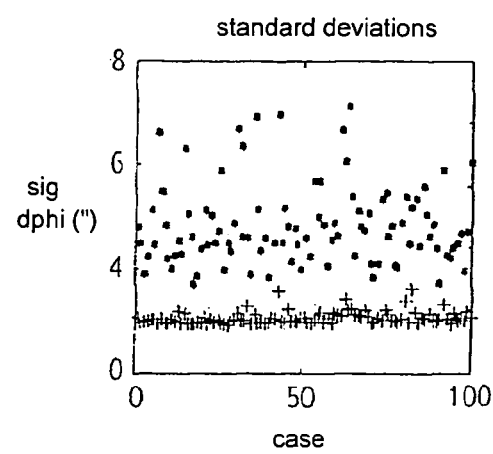
Figure 15C:
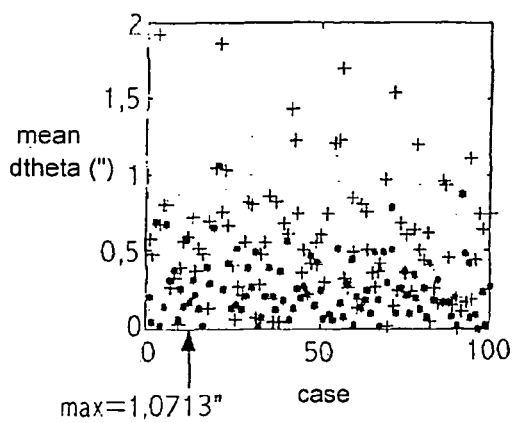
Figure 15D:
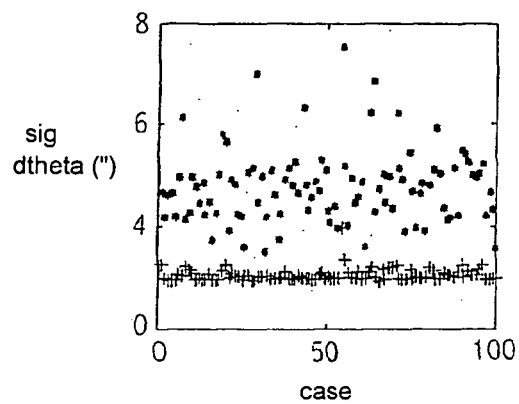
Figure 15E:
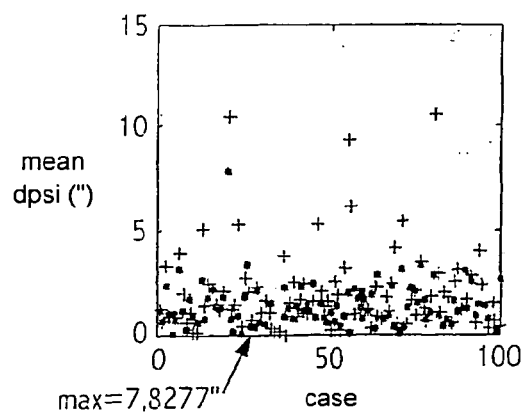
Figure 15F:
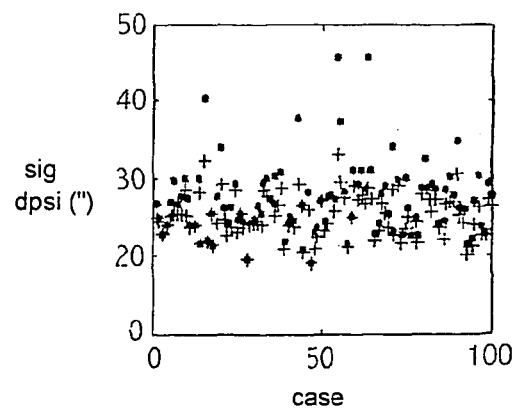
Figure 16A:
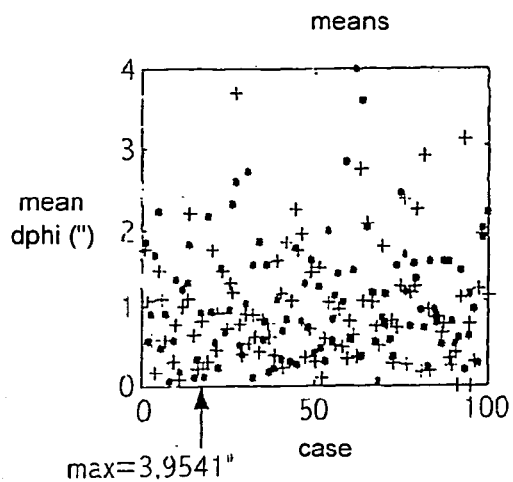
FIGS. 16a to 16f show the results obtained with non-radial errors having an amplitude of 5"
Figure 16B:
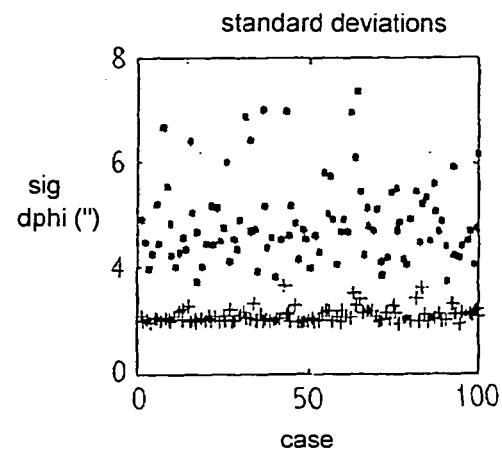
Figure 16C:
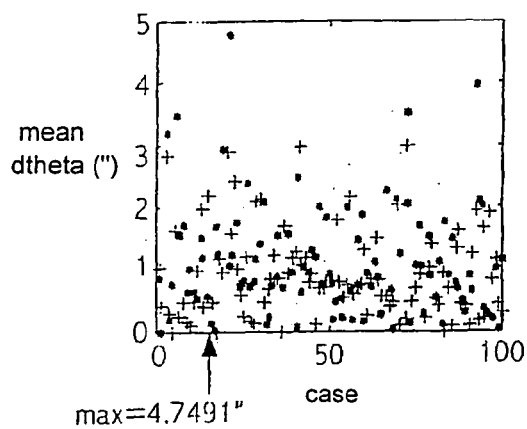
Figure 16D:
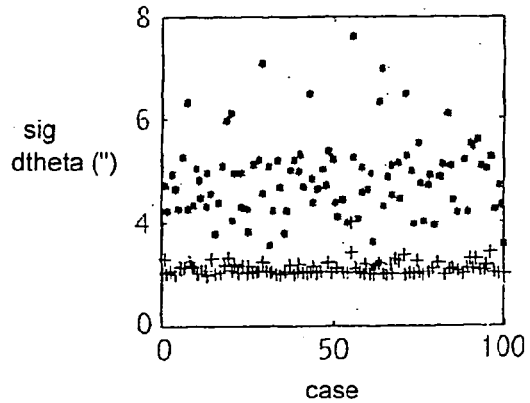
Figure 16E:
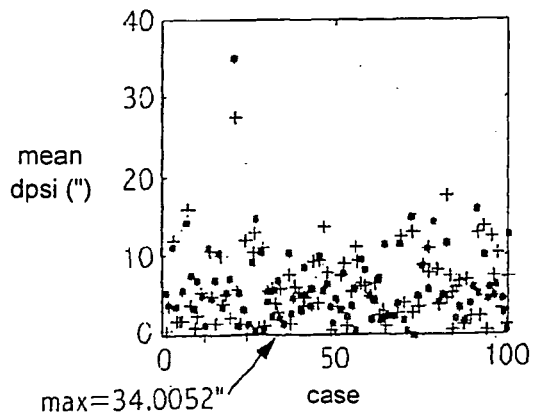
Figure 16F:
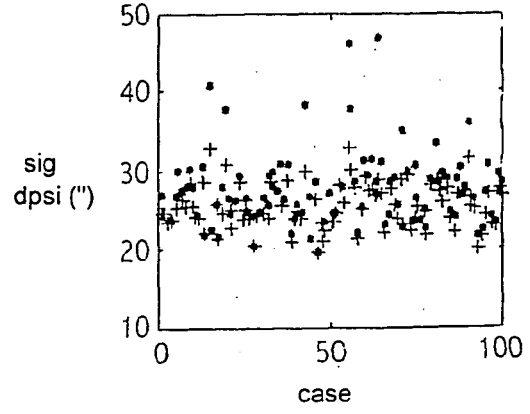

The first five cases (distinguished by the symbols represented the respective stars) are shown in FIG. 9.

Thereafter, the biases and the standard deviations on the attitude as determined with the conventional algorithm were compared with those for attitude as determined using the algorithm with distortion estimation. The results are shown in FIG. 10, where the maximum bias value obtained with the algorithm estimating distortion is given at the bottom of each curve. The results are also summarized in the following table, in which there can be distinguished the effects on the cross axes (marked $\perp$) and the effects on the SST aiming axis (marked //).

In these figures, crosses represents the results obtained with the simple least squares method, and dots represent the results obtained with the least squares method obtained with distortion estimation (6000 shots, nominal case).

In the nominal case, the following results were obtained:

| Maximum values over 6000 shots in (") | Mean $\perp$ axes | Std. dev. $\perp$ axes | Mean // axes | Std. dev. // axis |
|---|---|---|---|---|
| Conventional algorithm | 1.8 | 3.5 | 8.0 | 32.5 |
| Algorithm with distortion estimation | 0.2 | 7.8 | 1.0 | 45.0 |

The maximum value of the bias obtained with the conventional algorithm is close to 2", which is compatible with the worst case FOV error found in the previously evaluated results using 3 SSTs.

With the distortion estimating algorithm, there is observed a reduction in said bias compared with the conventional algorithm by a factor that is close to 10, on all three measurement axes, thereby demonstrating the effectiveness of the proposed algorithm. However, the standard deviation for noise on the cross axes is degraded by a factor of under 2 on average. The worst cases of degradation are correlated with the worst results of the conventional algorithm and are therefore attributed to the geometrical configuration of the stars. Noise degradation is not noticeable on the pointing axis.

These results, obtained under a very wide variety of geometrical configurations, confirm the conclusions of the preceding paragraph. It is clearly shown that the value of the bias-depends on the geometrical configuration, which confirms that variation of the star field in view as the satellite-moves will lead to "low frequency" variation over time in attitude measurement error. It is thus to be expected that there will be a reduction in error amplitude due to distortion residue when using a moving star field. It is recalled that this method relies on inline processing of measurements and does not rely on any filtering.

Pointing error has been taken into account on a random basis in application of a distribution relationship that is uniform over the range $\pm 500$ μrad on all three axes. The result is shown in FIG. 11 (6000 shots with pointing errors, crosses=simple least squares, dots=least squares with distortion estimation) and these results are summarized in the table below.

With Pointing Error:

| Maximum values over 6000 shots in (") | Mean $\perp$ axes | Std. dev. $\perp$ axes | Mean // axes | Std. dev. // axis |
|---|---|---|---|---|
| Conventional algorithm | 1.8 | 3.5 | 8.0 | 32.5 |
| Algorithm with distortion estimation | 0.2 | 7.8 | 1.0 | 45.0 |

For both algorithms, the order of magnitude of biases and standard deviations remains unaffected. The effectiveness of the algorithm with distortion estimation is comparable.

The algorithm is therefore robust in the face of pointing errors of the order of magnitude that is to be expected.

Simulations were repeated using assumptions that were successively five times greater and five times smaller for distortion error, other sources of error remaining unchanged (noise, pointing error). The respective results are shown in FIG. 12 (6000 shots, distortions ×5, crosses=simple least squares, blue dots=least squares with distortion error), and FIG. 13 (6000 shots, distortions /5, crosses=simple least squares, dots=least squares with distortion estimation), and they are summarized in the following tables.

Greater Distortion:

| Maximum values over 6000 shots in (") | Mean $\perp$ axes | Std. dev. $\perp$ axes | Mean // axes | Std. dev. // axis |
|---|---|---|---|---|
| Conventional algorithm | 8.5 | 3.5 | 48.0 | 33.0 |
| Algorithm with distortion estimation | 0.2 | 7.5 | 0.9 | 45.0 |

Smaller Distortion:

| Maximum values over 6000 shots in (") | Mean $\perp$ axes | Std. dev. $\perp$ axes | Mean // axes | Std. dev. // axis |
|---|---|---|---|---|
| Conventional algorithm | 0.7 | 3.5 | 2.0 | 33.0 |
| Algorithm with distortion estimation | 0.2 | 7.5 | 0.9 | 45.0 |

Attitude error standard deviations are insensitive to distortion assumptions, they depend only on star position measurement noise and on algorithm.

The reduction in bias introduced by the algorithm increases with the assumption that distortion is large compared with noise. There thus exists a lower limit for distortion residue relative to noise, below which the distortion estimating algorithm does nothing other than degrade noise without significantly improving bias.

The geometrical meaning of the underlying equations causes the distortion estimator algorithm to be well adapted to determining radial type errors, i.e. errors characterized by radial coupling of the two components of the position of a star in the focal plane. It is important to evaluate the robustness of the distortion estimator algorithm faced with different geometrical distribution errors.

The category of FOV errors includes other sources of errors depending on the star or on its position in the field: chromatic aberration, catalog errors, interpolation errors. Their impact on attitude measurements under inertial pointing also leads to bias associated with the configuration of the stars in the field.

The impact of chromatic aberrations on the performance of star position measurement as identified in a review of sensors varies greatly from one sensor to another. It lies in the range 30% to 150% of the distortion factor, from which it is not always clearly distinguished. To the first order, it appears that in an optical system, axial type chromatic aberrations do not have any effect on the centers of gravity of star spots, and that lateral type chromatics has an effect that is characterized by radial coupling like distortion. Nevertheless, this needs to be confirmed with the manufacturers of sensors as a function of the optical designs used.

Depending on manufacturer, the amplitude of catalog errors is evaluated as lying in the range negligible to 10% of distortion residue. The errors associated therewith may be considered as being distributed randomly as a function of star and along both axes in the focal plane.

Interpolation errors are not always distinguished from other FOV errors. It can be assumed that they are of arbitrary distribution in the plane of the detector if inertial pointing is perfect. These errors nevertheless give rise to a source of "high frequency" coupling between attitude measurement and pointing that make their effects difficult to assess. They are often treated as being time-varying noise.

The robustness of the algorithm has therefore been assessed in the face of error that is distributed randomly in amplitude and in direction as a function of each star. This has been done using a function for stimulating interpolation error. In the simulation tool, it is represented in the form of a sinusoidal spatial function of one-pixel period along both axes. Various amplitude values for this error have been taken into account: 0.3", 1", and 5". The results are shown respectively in FIG. 14 (6000 shots, interpolation errors of 0.3" amplitude, crosses=simple least squares, dots=least squares with distortion estimation), FIG. 15 (8000 shots, interpolation errors of 1" amplitude, crosses=simple least squares, dots=least squares with distortion estimation), and FIG. 16 (6000 shots, interpolation error of 5" amplitude, crosses=simple least squares, dots=least squares with dis tortion estimation), and they are summarized in the following tables:

Non-radial Error of 0.3":

| Maximum values over 6000 shots in (") | Mean ⊥ axes | Std. dev. ⊥ axes | Mean // axes | Std. dev. // axis |
|---|---|---|---|---|
| Conventional algorithm | 2.0 | 3.5 | 9.0 | 33.0 |
| Algorithm with distortion estimation | 0.3 | 7.0 | 2.5 | 45.0 |

Non-radial Error of 1":

| Maximum values over 6000 shots in (") | Mean ⊥ axes | Std. dev. ⊥ axes | Mean // axes | Std. dev. // axis |
|---|---|---|---|---|
| Conventional algorithm | 2.2 | 3.5 | 10.5 | 33.0 |
| Algorithm with distortion estimation | 1.1 | 7.5 | 7.8 | 45.0 |

Non-radial Error of 5":

| Maximum values over 6000 shots in (") | Mean ⊥ axes | Std. dev. ⊥ axes | Mean // axes | Std. dev. // axis |
|---|---|---|---|---|
| Conventional algorithm | 4.8 | 3.5 | 27.0 | 33.0 |
| Algorithm with distortion estimation | 4.8 | 7.5 | 34.6 | 45.0 |

The effects of amplifying noise as introduced by the distortion estimator algorithm are unchanged. However a loss of effectiveness in reducing bias is observed in the presence of non-radial errors. This reduction is no more than a factor of 3 in the presence of a non-radial error of 0.3", and is no longer perceptible in the presence of a non-radial error of 5". It is recalled that the assumed distortion residue is 9" at the edge of the field.

The performance of the algorithm is therefore limited little by the presence of errors whose spatial distribution is not radial.

The simulations described above show the potential advantage of an algorithm estimating the distortion of a star sensor for the purpose of reducing the resulting FOV attitude measurement error. The reduction that is observed is by a factor of slightly less than 10 on the cross axes with the assumptions that were adopted, which assumptions are representative of a typical sensor. A corresponding drawback lies in an increase in attitude noise by a factor that is close to 2, but its impact can be attenuated by the gyrostellar filter.

The proposed algorithm is simple. It can be implemented inline in processing measurements at star level. Compared with a conventional attitude-determining algorithm, it implies an increase in the size of the matrix for inversion that is linear with increasing number of stars to be processed. It preferably also takes advantage of approximate knowledge about the attitude that is to be measured, in a manner that is compatible with required pointing specifications.

Given the results obtained, the advantage of this algorithm is preferably restricted to a certain amplitude of noise level compared with distortion residue.

Simulations have also shown that although this algorithm does enable the impact of FOV errors in radial distortion in the field to be reduced, its advantage is more limited by FOV error sources that have non-radial distribution.

It is therefore desirable to make a fine assessment of the geometrical nature of all FOV error sources and their amplitudes.

The advantage of the algorithm also lies in the context of a complete system for gyrostellar attitude estimation taking account of realistic movements of stars in the field of view.

Following the above description of a first method for reducing "field of view" type errors by an algorithmic method applied directly to star outputs, there follows a description of an algorithm based on knowledge about the form of FOV errors in the field.

Thereafter there follows an analysis of this algorithm which has been performed not only with inertial pointing, but also while taking account of the simple satellite dynamics that are to be found in geocentric pointing.

In the method described above, the effects of distortion appear directly as fluctuations in the focal length at each point of the field. The distribution in the field of non-calibrated distortion residue is a random function in application of a relationship that is uniform in value and direction in the focal plane. The algorithm was therefore based on no assumption about how to model the errors.

Unlike the treatment described above, the description below is based on the fact that an assumption is available on the way distortion residue varies over the field. This fundamental assumption makes it possible to adapt the estimation algorithms so as to identify one or more coefficients that are characteristic of the distortion and so as to make the algorithm more effective by limiting the number of parameters that need to be estimated.

The description below proceeds as follows:
description of how errors are modeled;
validation of time signatures for each modeled error and demonstration of the advantage of the algorithm for a given star configuration with inertial pointing;
description of the algorithms under investigation;
statistical evaluation and performance that can be achieved with inertial pointing for different star configurations;
study in association with satellite dynamics for characterizing the time signatures of errors and impact on the operation of the algorithms proposed. The simulation tool used is suitable only for simple dynamics at constant speed. This suffices to simulate the dynamics that are encountered with geocentric pointing and to evaluate the performance that can be achieved with a moving star field; and
an analysis of the robustness of the process.

The dimensions of the sensor were based on the data described above so as to use a sensor close to the characteristics that are typically desired.
field of view 28°×28°;
focal length 30 cm;
number of stars tracked: 12;
frequency: 4 hertz (Hz);
measurement errors at the level of one star:
noise: 37" at 3σ;
distortion residue: 9" at 3σ.
Other faults were also proposed:
fluctuation in focal length: 1.5"/K at the edge of the field with temperature environment ±2° C.;
chromatic aberrations: 3" at 3σ; and
catalog errors: 0.3" at 3σ.

Concerning white noise, this is measurement noise having variance modeled as being constant over time. For simplification purposes, it contains interpolation errors which can be considered as being white noise. White noise is taken as being equal to 37" at 3σ along each measurement axis X and Y.

Figure 17A:
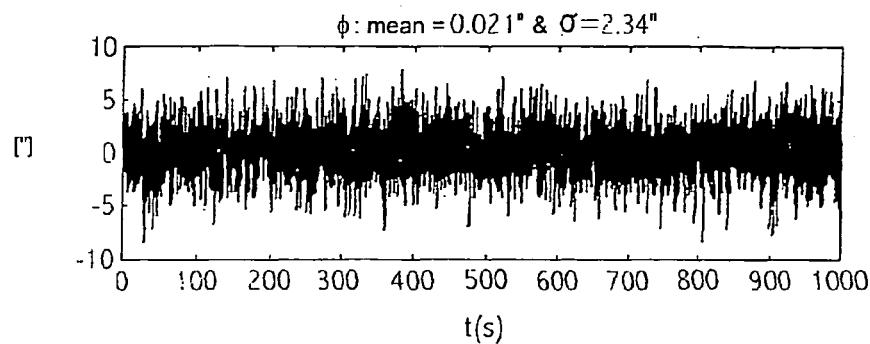
FIGS. 17a to 17c show the time-varying outputs of attitude as calculated by using conventional filtering.
Figure 17B:
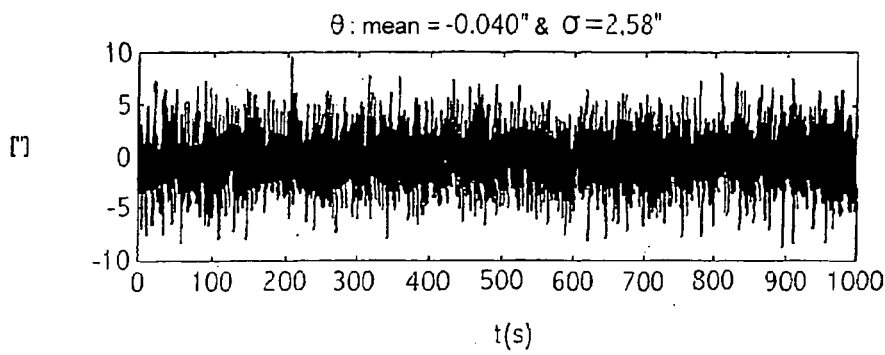
Figure 17C:
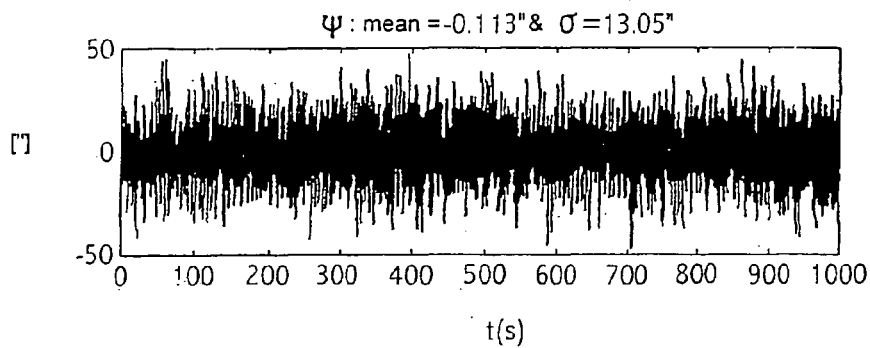

FIG. 17 plots the time-varying outputs in attitude as calculated by means of conventional filtering on the basis of noisy measurements.

The noise obtained is practically centered (the mean depends on the number of shots, i.e. on the time spent on simulation and on measurement frequency) with a standard deviation on the cross axes of about 2.5".

If the following multiplying factors are applied that correspond respectively:
to the number of stars: $\sqrt{12}$; and
to combining two cross axes: $\sqrt{2}$;

then, on going from 1σ to 3σ, the value of 37" is found for the measurement noise injected at each star.

Figure 18:
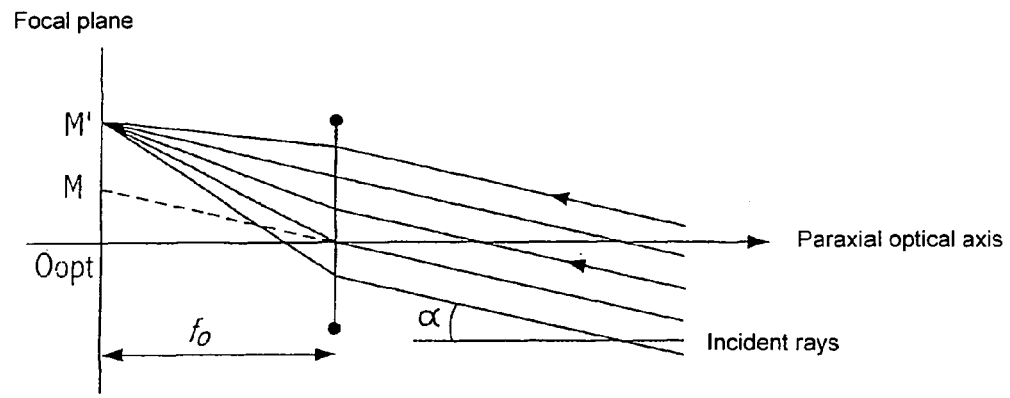
FIG. 18 shows a distribution of light rays, revealing distortion.

Distortion is an aberration that is a function of the position of the object point in the field. It does not affect the quality of the image of a point, but only its position, as shown in FIG. 18.

The rays coming from a star at an angle α converge at a point M' in the focal plane instead of at the point M as would be the case in an instrument without distortion.

This aberration is due to the quality of the shape of the lens. In the above example, distortion is an increasing function of focal plane, i.e.: $O_{opt}M'>O_{opt}M$. Nevertheless, it should be mentioned that distortion can equally well be a decreasing function.

Although the distortion-patterns can sometimes be complex in shape, with distortion being non-monotonic in the field, distortion is modeled in application of a radial relationship (distance from the point on the optical axis), as follows:

The following two magnitudes are defined:

$$r = O_{opt}M = f_0 \tan \alpha$$

$r' = O_{opt}M'$ as determined by ray tracing (optical code).

A relationship linking $r$ to $r'$ is interpolated in the following polynomial form:

$$r' = r(1 + D_3 r^2 + D_4 r^3 + D_5 r^4 + D_6 r^5 + D_7 r^6 \ldots) = p(r)$$

The degree of the polynomial p(r) is a function of the desired accuracy.

Knowledge of the polynomial coefficients ($D_3$, $D_4$, $D_5$, $D_6$, $D_7$, ...) makes it possible at all points of the field to calculate the contribution of the error due to distortion, and to correct it should that be necessary.

In general, for optical systems that are circularly symmetrical, symmetry considerations make it possible to assume that the even coefficients ($D_4$, $D_6$, ...) are zero. In the description below, we make this assumption, which does not make the investigation any less general, i.e.:

$$r' = r(1 + D_3 r^2 + D_5 r^4 + D_7 r^6 \ldots) = p(r)$$

On star sensors, calibration processes are implemented for the purpose of reducing the impact of distortion. Treatment makes it possible to take account of the coefficient $D_3$ and to reduce the errors associated with this defect.

We assume that distortion is calibrated to third order. In which case, the radial errors due to distortion residue can be modeled as follows:

$$r' = r(1 + D_5 r^4 + D_7 r^6)$$

Nevertheless, if necessary, it is possible also to take account of error in estimating the coefficient $D_3$.

For the present description, only one coefficient has been taken into account $D_5=6$ m$^{-4}$, estimated as follows in order to be representative of the performance of a typical star sensor.

In order to obtain values for fluctuation in focal length at the edge of the field of the kind defined in [1], the "apparent focal length" f' is determined at the edge of the field:

This gives:

$$\tan\alpha = \frac{r}{f}$$

nominally.

If distortion is considered to be a variation in focal length, the following relationship can be written:

$$\tan\alpha = \frac{r'}{f'}$$

in the presence of distortion.

Whence:

$$f' = \frac{r'}{r} \cdot f = (1 + D_5 r^4) \cdot f$$

It can thus be seen that estimating the shifted radius r' consists directly in calculating the deformed focal length f', and that the procedure for estimating r' itself consists in estimating f':

At the edge of the field:

$$r = f \cdot \tan\left(\frac{FOV}{2}\right) = 0.3 \cdot \tan(14°) = 0.0747 \text{ m}$$

Whence:

f'=0.300056 m

This represents an approximate fluctuation of focal length at the edge of the field of 56 μm, which comes close to the levels studied in [1], where the equivalent value was 60 μm.

Figure 19A:
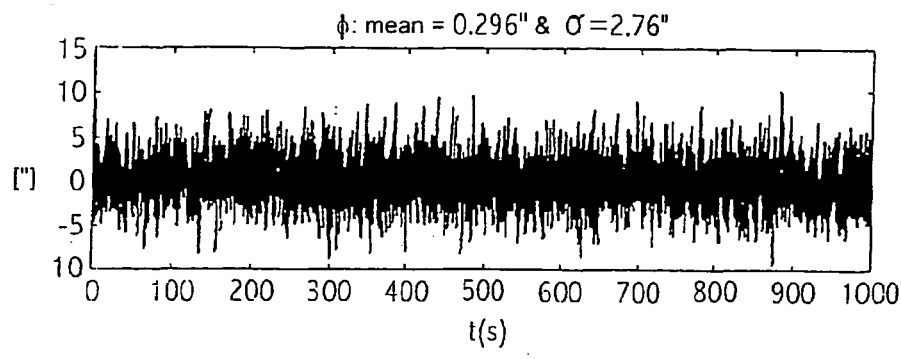
FIGS. 19a to 19c show time-varying curves of attitude error as estimated by using conventional filtering.
Figure 19B:
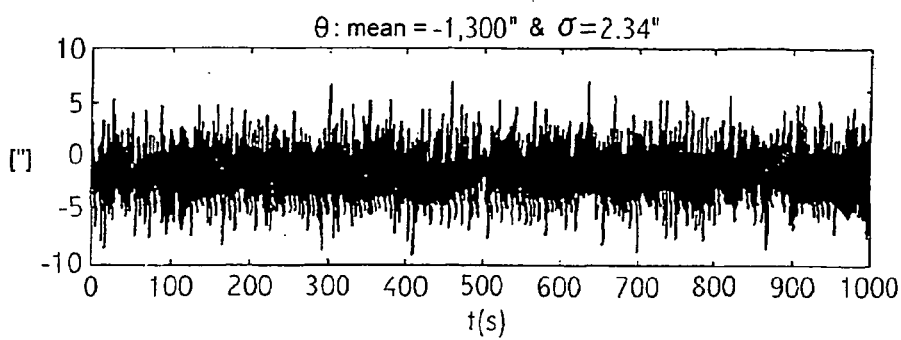
Figure 19C:
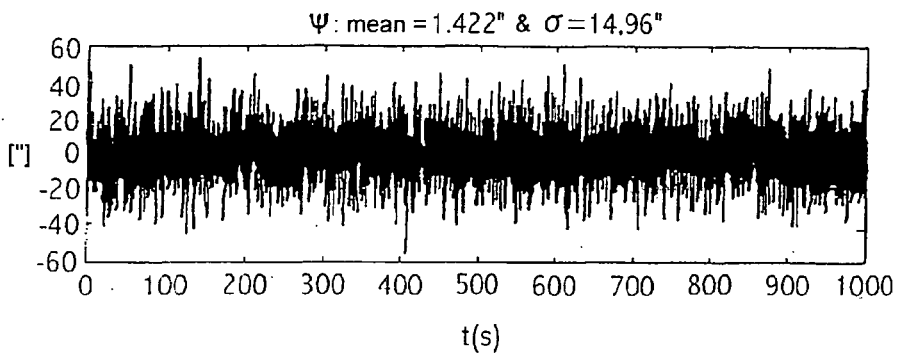

FIG. 19 shows time-varying plots corresponding to the errors in attitude as estimated on the basis of measurements including noise and distortion using conventional filtering and inertial pointing.

It can be seen that the signals are noisy and biased. This bias differs depending on axis.

0.3" for φ, 1.3" for θ (cross axes) and 1.4" for ψ.

In contrast, the standard deviations remain unchanged compared to outputs having noise only.

These biases are due to the distortion. The values of these biases depend solely on the configuration of the stars and such a value remains constant over time with inertial pointing.

It should be observed that with geocentric pointing, the values of these biases vary over time, since the star field changes continuously. A description below is based on time variant of these biases for a moving star field.

The purpose of the processing described below is to eliminate such bias using algorithms that take account of, deterministic characteristics of the distortion.

The biases of SST measurements are not filtered by a gyrostellar hybridization process and they lead to attitude errors that are highly penalizing in a localization result.

The algorithm proposed below applies directly to the ($x_i$, $y_i$) measurement provided by the CCD and corresponding to the coordinates of the spots relating to the respective target stars.

Figure 20:
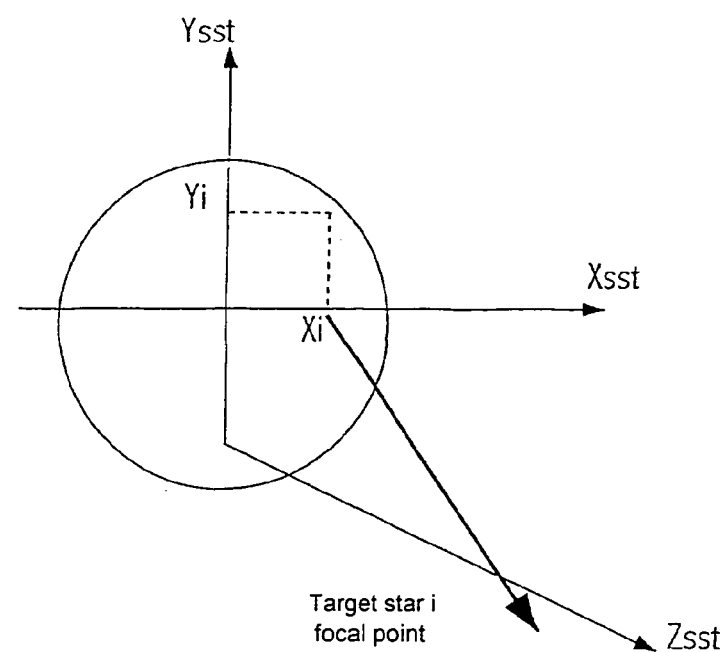
FIG. 20 shows a calculation reference point for a method in a variant of the invention.
Figure 21A:
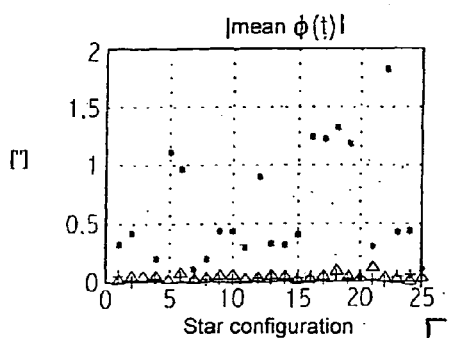
FIGS. 21a to 21f show results obtained with three algorithms, including two algorithms of the invention, for multiple fixed star configurations.
Figure 21B:
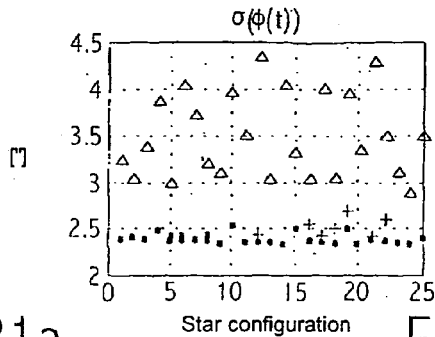
Figure 21C:
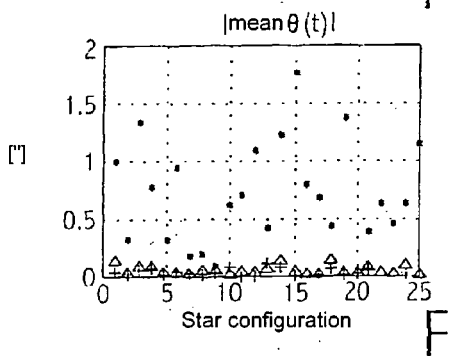
Figure 21D:
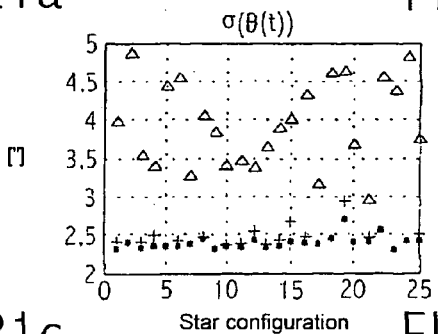
Figure 21E:
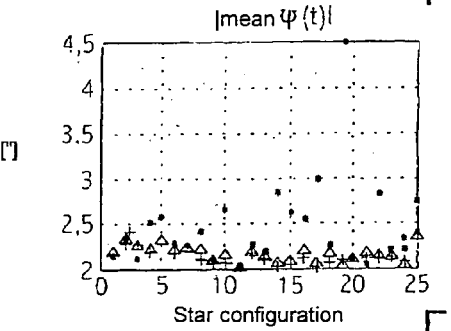
Figure 21F:
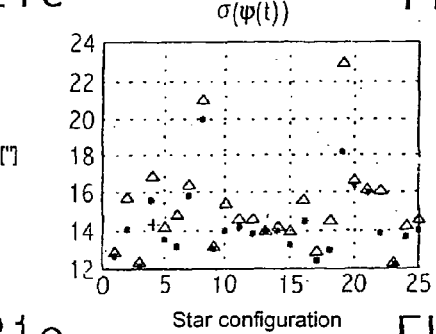

The frame of reference of the star sensor is defined as follows (cf. FIG. 20):

$X_{SST}$ and $Y_{SST}$ define the focal plane where the detector is located; and $Z_{SST}$ is the normal to said plane going out into space.

The attitude estimation algorithms described below are based on making use of director vectors of the various target stars expressed in two distinct frames of reference: the reference frame of reference and the true frame of reference.

The reference frame of reference Rc of the sensor is such that in this frame of reference the directions of the stars coincide with the vectors Vi.

At all times, the reference frame of reference is known and each target star i is projected onto the plane of the detector at a point having coordinates: ($x_i$, $y_i$).

Thus, the corresponding unit vector is written as follows:

$$[Vi] = \left(\frac{1}{\sqrt{x_i^2 + y_i^2 + f^2}} \begin{bmatrix} x_i \\ y_i \\ -f \end{bmatrix}\right) = \begin{bmatrix} v_{ix} \\ v_{iy} \\ v_{iz} \end{bmatrix}$$

giving:

$$\frac{v_{ix}}{v_{iz}} = -\frac{x_i}{f} \text{ and } \frac{v_{iy}}{v_{iz}} = -\frac{y_i}{f}$$

The real frame of reference Rs of the sensor is such that the directions of the target stars in the sensor frame of reference become vectors Wi.

$$[Wi] = \left(\frac{1}{\sqrt{x_{mi}^2 + y_{mi}^2 + f^2}} \begin{bmatrix} x_{mi} \\ y_{mi} \\ -f \end{bmatrix}_i\right) = \begin{bmatrix} w_{mix} \\ w_{miy} \\ w_{miz} \end{bmatrix}$$

giving:

$$\frac{w_{mix}}{w_{miz}} = -\frac{x_{mi}}{f} \text{ and } \frac{w_{miy}}{w_{miz}} = -\frac{y_{mi}}{f}$$

The standard deviation between these two magnitudes represents the attitude difference between the reference frame of reference and the satellite frame of reference.

Assuming that this difference is "small", the equations are linearized around the reference attitude. This gives the following matrix relationship:

$$W_i \approx \begin{bmatrix} 1 & \psi & -\theta \\ -\psi & 1 & \psi \\ \theta & -\psi & 1 \end{bmatrix} \cdot V_i$$

-continued i.e.:

$$\begin{cases} w_{mix} = v_{ix} - \theta \cdot v_{iz} + \psi \cdot v_{iy} \\ w_{miy} = v_{iy} + \psi \cdot v_{iz} - \psi \cdot v_{ix} \\ w_{miz} = v_{iz} - \psi \cdot v_{iy} + \theta \cdot v_{ix} \end{cases}$$

giving:

$$-\frac{x_{mi}}{f} = \frac{w_{mix}}{w_{miz}} = \frac{v_{ix} + \psi \cdot v_{iy} - \theta \cdot v_{iz}}{v_{iz} + \theta \cdot v_{ix} - \psi \cdot v_{iy}} \approx$$

$$\frac{v_{ix}}{v_{iz}} + \psi \cdot \frac{v_{ix} \cdot v_{iy}}{v_{iz}^2} - \theta \cdot \left(1 + \frac{v_{ix}^2}{v_{iz}^2}\right) + \psi \cdot \frac{v_{iy}}{v_{iz}}$$

$$-\frac{y_{mi}}{f} = \frac{w_{miy}}{w_{miz}} = \frac{v_{iy} + \psi \cdot v_{ix} - \psi \cdot v_{iz}}{v_{iz} + \theta \cdot v_{ix} - \psi \cdot v_{iy}} \approx$$

$$\frac{v_{ix}}{v_{iz}} + \psi \cdot \left(1 + \frac{v_{iy}^2}{v_{iz}^2}\right) - \theta \cdot \frac{v_{ix} \cdot v_{iy}}{v_{iz}^2} - \psi \cdot \frac{v_{ix}}{v_{iz}}$$

It is then possible to write the following for each target star i:

$$\Delta_i = \begin{bmatrix} \frac{x_i - x_{mi}}{f} \\ \frac{y_i - y_{mi}}{f} \end{bmatrix} = J_i \cdot \begin{bmatrix} \psi \\ \theta \\ \psi \end{bmatrix}$$

With:

$$J_i = \begin{bmatrix} \frac{v_{ix} \cdot v_{iy}}{v_{iz}^2} & -\left(1 + \frac{v_{ix}^2}{v_{iz}^2}\right) & \frac{v_{iy}}{v_{iz}} \\ \left(1 + \frac{v_{iy}^2}{v_{iz}^2}\right) & -\frac{v_{ix} \cdot v_{iy}}{v_{iz}^2} & -\frac{v_{ix}}{v_{iz}} \end{bmatrix}$$

The equation of the entire system (a plurality of target stars) is written in the form: $\Delta = J \cdot X$ where:

$$J = \begin{bmatrix} J_1 \\ \vdots \\ J_n \end{bmatrix}$$

is the Jacobian of size [2×num_target_stars, num_states];

$$\Delta = \begin{bmatrix} \Delta_1 \\ \vdots \\ \Delta_n \end{bmatrix}$$

is the observation vector of size 2 num_target_stars;

X is the state to be estimated.

The least squares solution to the above system of equations is given directly by the following matrix relationship:

$$X = (J^T \cdot J)^{-1} \cdot (J^T \cdot \Delta)$$

The inversion of $J^T \cdot J$ can be performed simply when the number of states is small (typically 3 or 4). However, when the number of states is large (cf. algorithm for estimating focal length), computations can become quite heavy.

Conventional least square estimation leads to the following previously-established matrix $J_i$:

$$J_i = \begin{bmatrix} \frac{v_{ix} \cdot v_{iy}}{v_{iz}^2} & -\left(1 + \frac{v_{ix}^2}{v_{iz}^2}\right) & \frac{v_{iy}}{v_{iz}} \\ \left(1 + \frac{v_{iy}^2}{v_{iz}^2}\right) & -\frac{v_{ix} \cdot v_{iy}}{v_{iz}^2} & -\frac{v_{ix}}{v_{iz}} \end{bmatrix} \text{ of size [2, 3]}$$

The description below relies on the algorithm proposed for the method described in the first part of this description.

If it is assumed that the distortion is a dispersion in focal length in the field of view (and usually an increasing function of distance from the center of field), each star is associated with a local value of focal length $f_i$, that is defined as follows:

$$f_i = f_{ref}(1 + \delta f_i)$$

The system is then solved by estimating the attitude error and the focal length difference $\delta f_i$ for each target star.

This makes it possible to establish the matrix $J_i$ (cf. [1]) relating to the target star i:

$$J_i = \begin{bmatrix} \frac{v_{ix} \cdot v_{iy}}{v_{iz}^2} & -\left(1 + \frac{v_{ix}^2}{v_{iz}^2}\right) & \frac{v_{iy}}{v_{iz}} & 0 \ldots 0 & \frac{v_{ix}}{v_{iz}} & 0 \ldots 0 \\ \left(1 + \frac{v_{iy}^2}{v_{iz}^2}\right) & -\frac{v_{ix} \cdot v_{iy}}{v_{iz}^2} & -\frac{v_{ix}}{v_{iz}} & 0 \ldots 0 & \frac{v_{iy}}{v_{iz}} & 0 \ldots 0 \end{bmatrix}$$

of size [2,num_target_stars]

Unlike the algorithm for estimating the coefficients of a distortion model, this algorithm makes no assumption about the way in which focal length varies over the field. It is true that considering distortion as a variation in focal length makes it possible to consider radial errors, but no additional assumption is made as to the way in which distortion residue varies in the field.

The algorithm above estimated 3+num_target_stars parameters. Since each target star provides two equations, the algorithm can be implemented whenever:

2 num_target_stars ≧ 3+num_target_stars, i.e. when num_target_stars ≧ 3.

The matrix inversion that is needed for solving the system makes use of a matrix of the same size as the number of states, i.e. num_target_stars, which can lead to difficulties if the number of target stars is high (typically about twelve).

It should be observed that for a given number of measurement equations, it should be expected that noise would be greater in this algorithm than for the first two algorithms. Since the number of states is higher, the proportion of measurement equations dedicated to estimating each of the states is smaller.

If distortion errors are to be corrected, it suffices to estimate the polynomial coefficients that characterize the distortion. To do this, equations are written that take account of the distorted coordinates in order to make these coefficients appear explicitly.

$$x'_i = \frac{r'}{r} x_i = (1 + D_3 r^2 + D_5 r^4 + D_7 r^6 + \ldots) \cdot x_i$$

$$y'_i = \frac{r'}{r} y_i = (1 + D_3 r^2 + D_5 r^4 + D_7 r^6 + \ldots) \cdot y_i$$

where:

$$r = \sqrt{x_i'^2 + y_i'^2}$$

$x_i$ and $y_i$ are known. They are the non-distorted reference coordinates.

$x_i'$ and $y_i'$ are the coordinates calculated with distortion. This gives:

$$\frac{v_{ix}'}{v_{iz}'} = \frac{r'}{r} \frac{v_{ix}}{v_{iz}} \quad \text{and} \quad \frac{v_{iy}'}{v_{iz}'} = \frac{r'}{r} \frac{v_{iy}}{v_{iz}}$$

In order to find the attitude errors, the following are compared:

[$X'_{mi}$; $y'_{mi}$]: coordinates of the target star given by the distorted measurement in the satellite frame of reference; and

[$x'_i$; $y'_i$]: distorted coordinates of the target star expressed using the model for distortion as a function of [$x_i$; $y_i$], the coordinates of the target star in the reference frame of reference.

The following equation is written that is representative of linearizing the change-of-frame matrix:

$$-\frac{x'_{mi}}{f} \approx \frac{v'_{ix}}{v'_{iz}} + \varphi \cdot \frac{v'_{ix} \cdot v'_{iy}}{v'^2_{iz}} - \theta \cdot \left(1 + \frac{v'^2_{ix}}{v'^2_{iz}}\right) + \psi \cdot \frac{v'_{iy}}{v'_{iz}}$$

$$-\frac{y'_{mi}}{f} \approx \frac{v'_{iy}}{v'_{iz}} + \varphi \cdot \left(1 + \frac{v'^2_{iy}}{v'^2_{iz}}\right) - \theta \cdot \frac{v'_{ix} \cdot v'_{iy}}{v'^2_{iz}} - \psi \cdot \frac{v'_{ix}}{v'_{iz}}$$

i.e.:

$$-\frac{x'_{mi}}{f} \approx \frac{r'}{r} \frac{v_{ix}}{v_{iz}} + \varphi \cdot \frac{r'^2}{r^2} \frac{v_{ix} \cdot v_{iy}}{v^2_{iz}} - \theta \cdot \left(1 + \frac{r'^2}{r^2} \frac{v^2_{ix}}{v^2_{iz}}\right) + \psi \cdot \frac{r'}{r} \frac{v_{iy}}{v_{iz}}$$

$$-\frac{y'_{mi}}{f} \approx \frac{r'}{r} \frac{v_{iy}}{v_{iz}} + \varphi \cdot \left(1 + \frac{r'^2}{r^2} \frac{v^2_{iy}}{v^2_{iz}}\right) - \theta \cdot \frac{r'^2}{r^2} \frac{v_{ix} \cdot v_{iy}}{v^2_{iz}} - \psi \cdot \frac{r'}{r} \frac{v_{ix}}{v_{iz}}$$

with:

$$\frac{r'}{r} = (1 + D_3 r^2 + D_5 r^4 + D_7 r^6 + \ldots)$$

Whence, after linearization:

$$-\frac{x'_{mi}}{f} \approx \frac{v_{ix}}{v_{iz}} + \varphi \cdot \frac{v_{ix} \cdot v_{iy}}{v^2_{iz}} - \theta \cdot \left(1 + \frac{v^2_{ix}}{v^2_{iz}}\right) +$$

$$\psi \cdot \frac{v_{iy}}{v_{iz}} + (D_3 r^2 + D_5 r^4 + D_7 r^6 + \ldots) \cdot \frac{v_{ix}}{v_{iz}}$$

$$-\frac{y'_{mi}}{f} \approx \frac{v_{iy}}{v_{iz}} + \varphi \cdot \left(1 + \frac{v^2_{iy}}{v^2_{iz}}\right) -$$

$$\theta \cdot \frac{v_{ix} \cdot v_{iy}}{v^2_{iz}} - \psi \cdot \frac{v_{ix}}{v_{iz}} + (D_3 r^2 + D_5 r^4 + D_7 r^6 + \ldots) \cdot \frac{v_{iy}}{v_{iz}}$$

The corresponding matrix $J_i$ is deduced therefrom:

$$J_i = \begin{bmatrix} \frac{v_{ix} \cdot v_{iy}}{v^2_{iz}} & -\left(1 + \frac{v^2_{ix}}{v^2_{iz}}\right) & \frac{v_{iy}}{v_{iz}} & r^2 \cdot \frac{v_{ix}}{v_{iz}} & r^4 \cdot \frac{v_{ix}}{v_{iz}} & r^6 \cdot \frac{v_{ix}}{v_{iz}} & \ldots \\ \left(1 + \frac{v^2_{iy}}{v^2_{iz}}\right) & -\frac{v_{ix} \cdot v_{iy}}{v^2_{iz}} & -\frac{v_{ix}}{v_{iz}} & r^2 \cdot \frac{v_{iy}}{v_{iz}} & r^4 \cdot \frac{v_{iy}}{v_{iz}} & r^6 \cdot \frac{v_{iy}}{v_{iz}} \end{bmatrix}$$

of size [2, 3+Ncoef].

This matrix makes it possible to estimate (3+Ncoef) states: [$\phi$ $\theta$ $\psi$ $D_3$ $D_5$ $D_7$ ...].

Since each target star provides two equations, this algorithm (and the preceding algorithm) can be implemented providing the number of target stars is greater than:

$$\frac{3 + Ncoef}{2}$$

The method described above deals with a quite general case enabling a plurality of distortion coefficients to be computed. In practice, the coefficient $D_3$ is known (by calibration), so it is desired to estimate $D_5$ (and possibly also $D_7$). In which case, all of the terms in $D_3$ are passed to the first member. Nevertheless, it would also be possible to take into consideration possible error in the estimation of $D_3$, and pass this term to the first member.

For each of the simulations, each of the three estimation algorithms are applied for different star configurations. This enables the performance of the algorithms to be compared.

In each of the figures described below, the following legends apply:

*: conventional algorithm (written "conventional" in the tables);

+: algorithm with estimated coefficients for a distortion model (written "distortion" in the tables);

Δ: algorithm with estimated local focal lengths for each star (written "F_length" in the tables).

Time simulation was performed for a certain length of time for each star configuration.

Attitude errors $\Phi^k(t)$, $\theta^k(t)$, $\psi^k(t)$ were deduced from the time-varying outputs for each of the filtering strategies. $\overline{\Phi}^k$, $\overline{\theta}^k$, $\overline{\psi}^k$ denote the time means and $\sigma^k(\Phi)$, $\sigma^k(\theta)$, $\sigma^k(\psi)$ denote the standard deviations.

The following were then calculated:

$\overline{\Phi}$ max: the maximum value of the time means over all the configurations, $\overline{\Phi}$ mean: the mean value of the time means over all of the configurations;

$\sigma(\overline{\phi})$: standard deviation of the mean values over all of the configurations;

$\sigma(\phi)$ max: maximum value of the standard deviations of $\phi(t)$ over all of the configurations;

$\sigma(\phi)$ mean: mean value of the standard deviations of $\phi(t)$ over all of the configurations.

Each star configuration was drawn randomly. With inertial pointing, such a configuration remains unchanged, where with geocentric pointing it varies depending on the selected dynamic relationship. Star density was calculated so that the sensor always had twelve stars in its field of view.

It is recalled that the distortion modeled in the simulations enables star measurements to be generated, in a manner that complies with the $D_3$, $D_5$ model.

FIG. 21 shows the results obtained with the three algorithms for 25 star configurations over a duration of 1000 seconds (s). (Given that the sensor delivers data at 4 Hz, these simulations correspond to 4000 shots.)

Certain meaningful results are set out in the tables below.

Values Concerning Mean Values of Attitudes:

|  | $\bar{\phi}$ max | $\bar{\phi}$ mean | $\sigma(\bar{\phi})$ | $\bar{\theta}$ max | $\bar{\theta}$ mean | $\sigma(\bar{\theta})$ | $\bar{\psi}$ max | $\bar{\psi}$ mean | $\sigma(\bar{\psi})$ |
|---|---|---|---|---|---|---|---|---|---|
| 1-Conventional | 1.823 | 0.253 | 0.725 | 1.762 | 0.253 | 0.796 | 2.496 | 0.040 | 0.687 |
| 2-Distortion | 0.058 | 0.011 | 0.029 | 0.108 | 0.003 | 0.041 | 0.302 | 0.026 | 0.150 |
| 3-F_length | 0.111 | 0.010 | 0.042 | 0.128 | 0.005 | 0.057 | 0.336 | 0.027 | 0.178 |

These can be seen to be the same results as those described above with reference to the first variant of the invention, i.e. they present good filtering of static errors (bias) due to distortion:

Thus, for example, for angle φ and for filtering estimating distortion:
 the maximum mean error goes from 1.8" to 0.06"; and
 over all 25 random configurations, the mean error which was 0.25" goes to 0.01" with dispersion going from 0.72" to 0.029".

Values Relating to Standard Deviations:

|  | φ | | θ | | ψ | |
|---|---|---|---|---|---|---|
|  | σ max | σ mean | σ max | σ mean | σ max | σ mean |
| 1-Conventional | 2.527 | 2.388 | 2.670 | 2.390 | 19.949 | 14.270 |
| 2-Distortion | 2.692 | 2.437 | 2.928 | 2.454 | 19.980 | 14.280 |
| 3-F_length | 4.331 | 3.490 | 4.870 | 3.932 | 22.914 | 15.141 |

Better results are observed with the algorithm estimating the coefficients of the distortion model, which unlike the algorithms for estimating local-focal length, leads to very little increase in noise level, on any of these three axes.

With inertial pointing, it can be assumed to the first order that attitude estimation is spoilt by static bias (due to distortion) and by white noise (due to measurement noise).

The algorithm for filtering distortion enables static error to be attenuated without increasing measurement noise.

The results obtained with a moving star field are described below.

The objective is to evaluate the impact of the star field moving on estimation performance. The simulations consisted in moving the stars across the field of the detector in a certain direction and at a certain speed that remained unchanging throughout the duration of the simulation.

At all times, new stars penetrated into the field of view of the detector. The magnitudes of the stars were drawn randomly in application of a uniform relationship between 1 and 6. At each instant, the program selected the brightest stars in its field of view and carried out estimation processing on the basis of those measurements.

Figure 22:
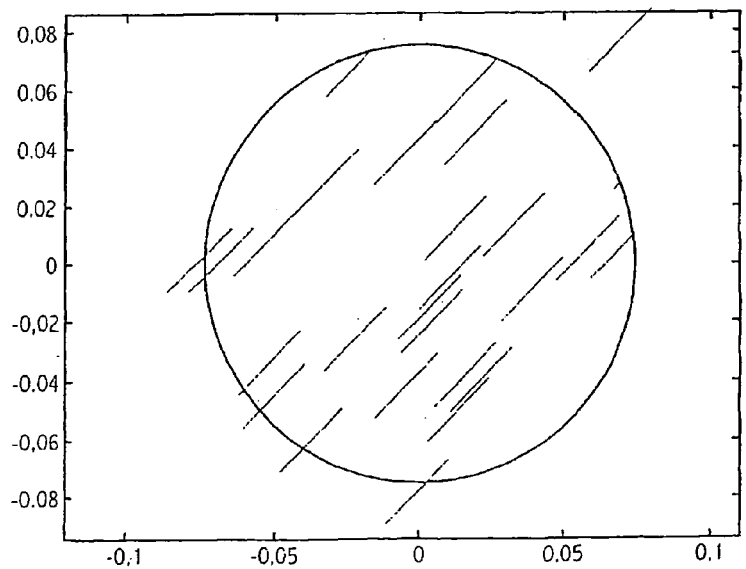
FIG. 22 shows the impact of the stars moving on estimation performance.
Figure 23A:
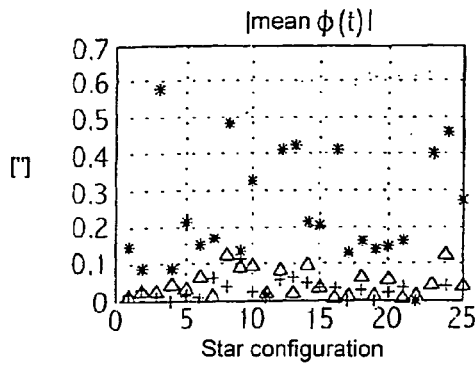
FIGS. 23a to 23f show the impact of the stars moving on estimation performance.
Figure 23B:
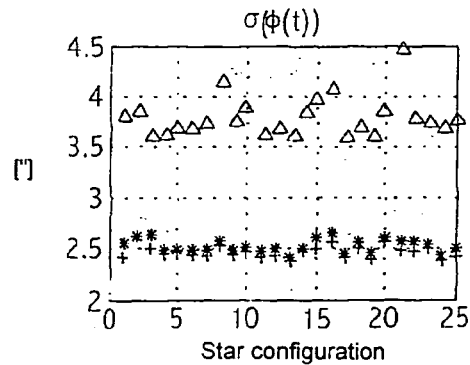
Figure 23C:
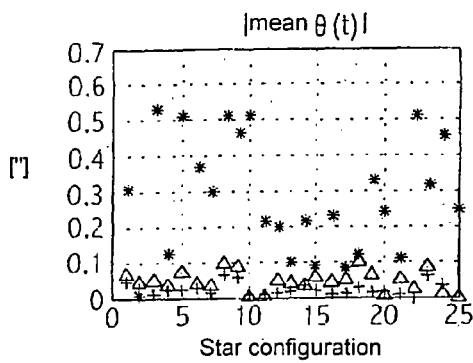
Figure 23D:
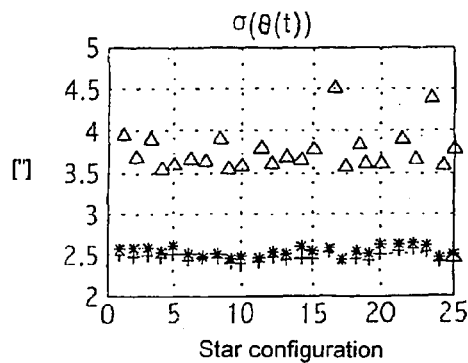
Figure 23E:
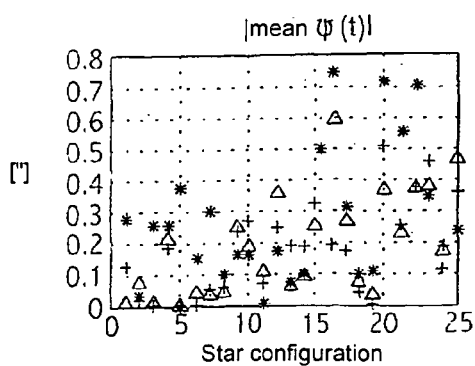
Figure 23F:
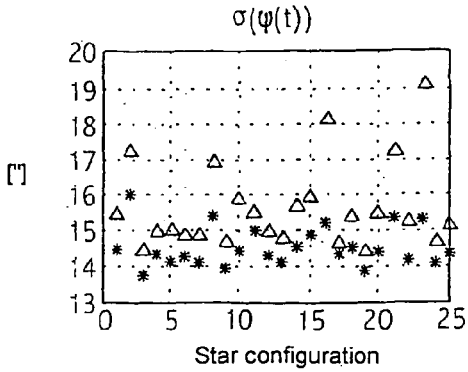

FIG. 22 shows the traces of a few stars across the detector of the sensor over a relatively short duration (100 s).

The direction of movement is given by the angle α: for the simulations below, this angle was selected so that α=45°.

The influence of the star field moving is discussed below.

The case of geocentric pointing was considered. For an orbital period of 100 minutes (min) the speed at which the star field moves is 0.06°/s.

For a field of 28°, the characteristic time for the entire field to be renewed is:

$$\tau = \frac{28}{0.06} = 467 \text{ s}$$

giving a renewal frequency of $2.1 \cdot 10^{-3}$ Hz.

FIG. 23 shows the performance for 25 star configurations drawn randomly, and for a simulated duration of 1000 s.

Certain meaningful results are summarized in the tables below.

Values Relating to Mean Values for Attitudes:

|  | $\bar{\phi}$ max | $\bar{\phi}$ mean | $\sigma(\bar{\phi})$ | $\bar{\theta}$ max | $\bar{\theta}$ mean | $\sigma(\bar{\theta})$ | $\bar{\psi}$ max | $\bar{\psi}$ mean | $\sigma(\bar{\psi})$ |
|---|---|---|---|---|---|---|---|---|---|
| 1-Conventional | 0.578 | 0.157 | 0.241 | 0.540 | 0.149 | 0.303 | 0.753 | 0.108 | 0.339 |
| 2-Distortion | 0.115 | 0.026 | 0.038 | 0.067 | 0.004 | 0.031 | 0.512 | 0.091 | 0.217 |
| 3-F_length | 0.124 | 0.013 | 0.053 | 0.103 | 0.004 | 0.055 | 0.594 | 0.083 | 0.237 |

There can be seen a reduction in the maximum mean error obtained with conventional filtering that goes from 1.8" with inertial pointing to 0.5" with geocentric pointing for the cross axes. The standard deviation in all 25 configurations remained the same (2.6").

The performance reached with filtering of types 2 and 3 are of the same order of magnitude as with inertial pointing (about 0.1" for maximum mean values).

Values Relating to Standard Deviations:

|  | φ | | θ | | ψ | |
|---|---|---|---|---|---|---|
|  | σ max | σ mean | σ max | σ mean | σ max | σ mean |
| 1-Conventional | 2.670 | 2.532 | 2.653 | 2.539 | 16.002 | 14.538 |
| 2-Distortion | 2.591 | 2.470 | 2.588 | 2.469 | 15.997 | 14.523 |
| 3-F_length | 4.480 | 3.792 | 4.152 | 3.772 | 19.121 | 15.607 |

A moving star field has no visible consequence on the values of the standard deviations.

Figure 24:
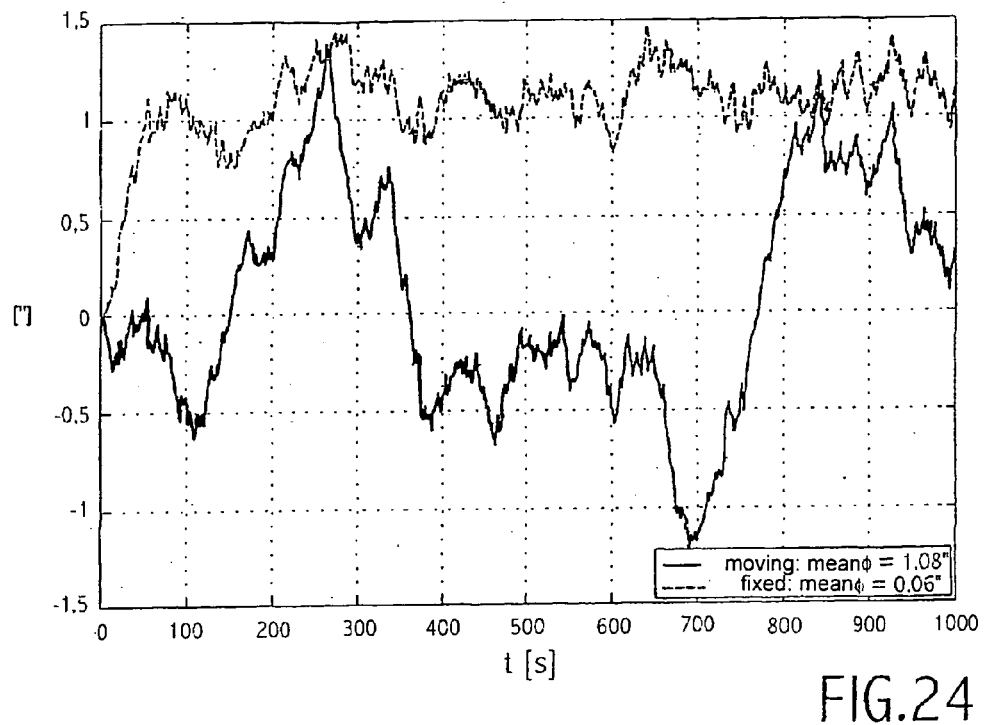
FIG. 24 shows results obtained with a conventional algorithm for moving and stationary star fields.
Figure 26:
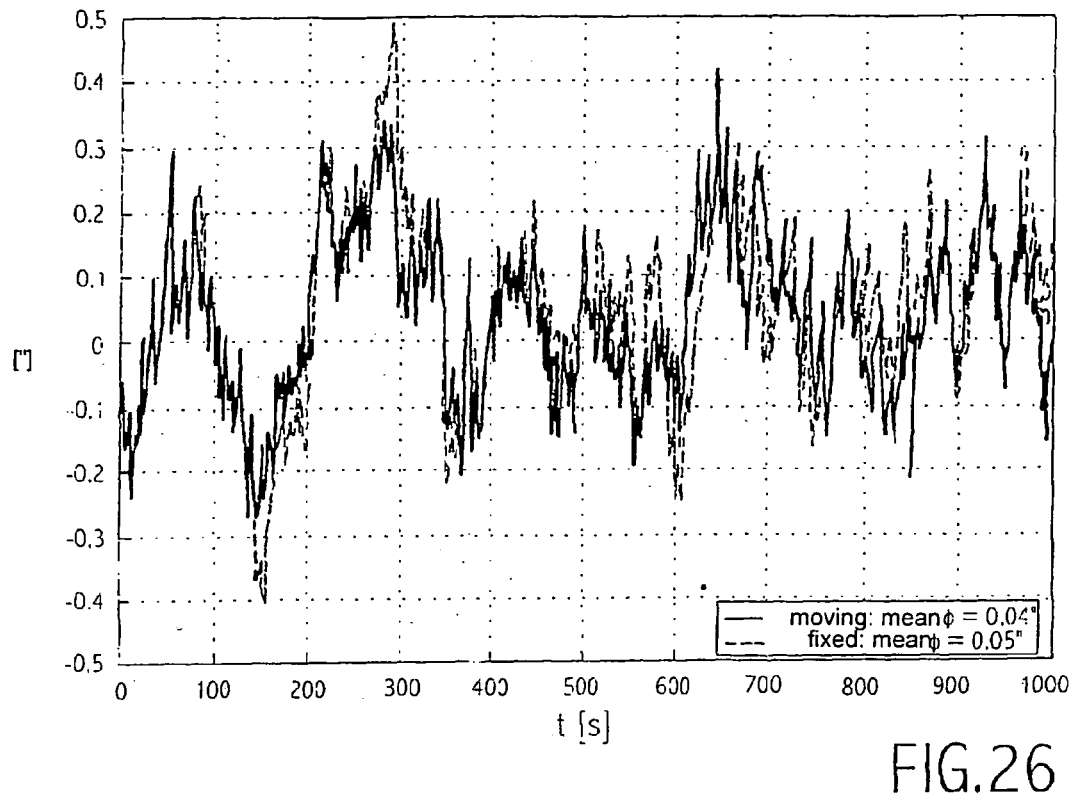
FIG. 26 shows the same elements as FIG. 25 but when using a distortion-estimating filter.

FIGS. 24 and 26 show time-varying curves for the angle φ as obtained with a fixed star field and with a moving star field in one of these configurations. In order to make these curves more "readable", only the low frequency components ([0, 0.005] Hz) of the signals are shown (lowpass filtering).

FIG. 24 shows the results obtained with a conventional algorithm. This revels the almost steady bias when using a stationary star field (mean value 1.08").

With a moving star field, this bias varies over time about a mean value that is almost zero (in this case about 0.06"), with values that can become as great as 1.3".

Around the frequency of star field renewal (i.e. $2.10^{-3}$ Hz), low frequency dynamic behavior can be seen to appear that is associated with the characteristic time τ of field renewal and that is due to distortion, and this did not appear with inertial pointing.

Figure 25:
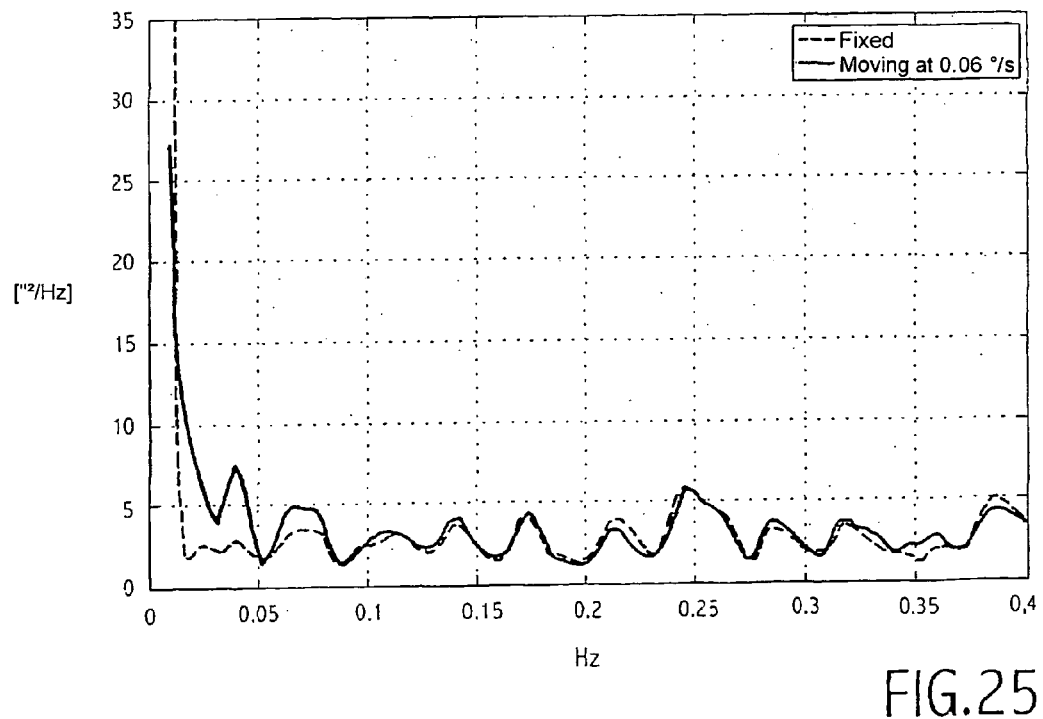
FIG. 25 shows the spectral densities of an angle $\Phi$ when using conventional filtering.

FIG. 25 shows this result in which the spectral densities of the angle φ are plotted for a stationary star field and for a moving star field, with conventional filtering.

Distortion filtering also makes it possible to lower the level of noise due to distortion, and thus to eliminate this low frequency dynamic behavior.

Figure 27:
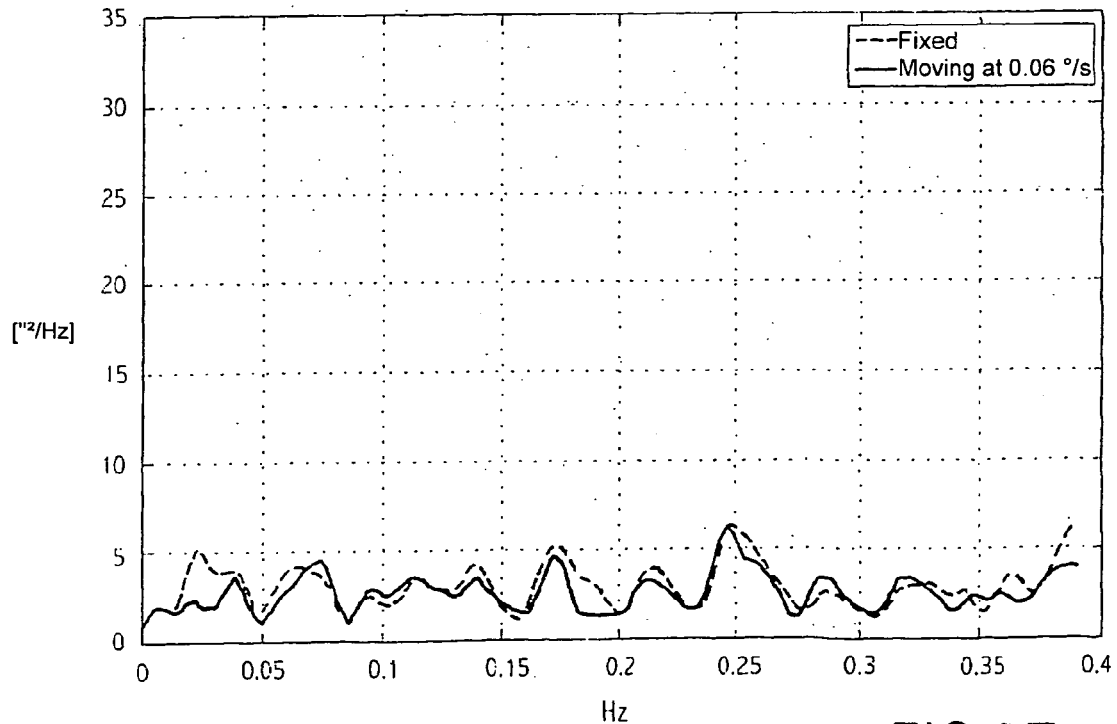
FIG. 27 shows the spectral densities of the filtered outputs.
Figure 28A:
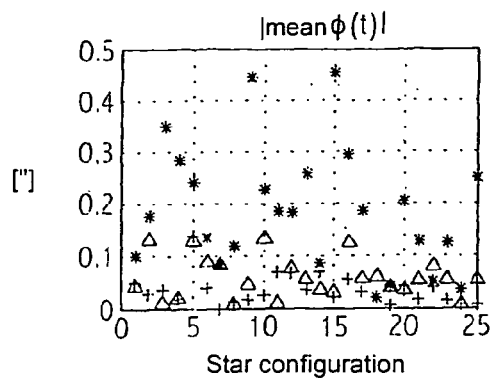
FIGS. 28a to 28f show results of estimation with a star passing at a speed of 0.1°/s.
Figure 28B:
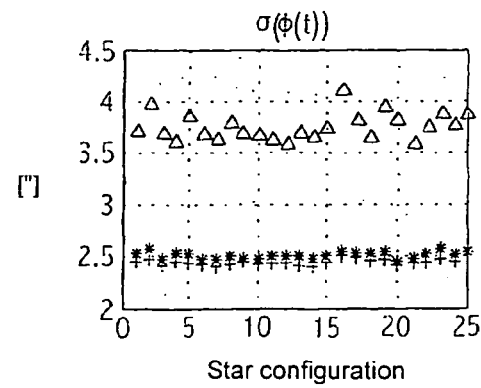
Figure 28C:
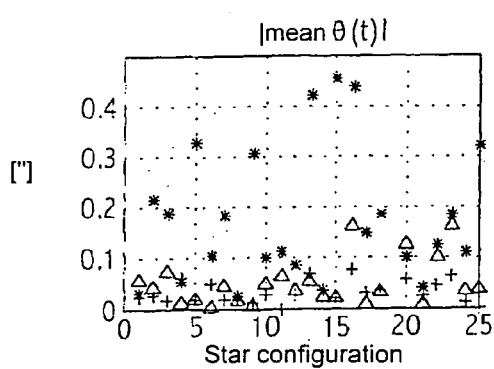
Figure 28D:
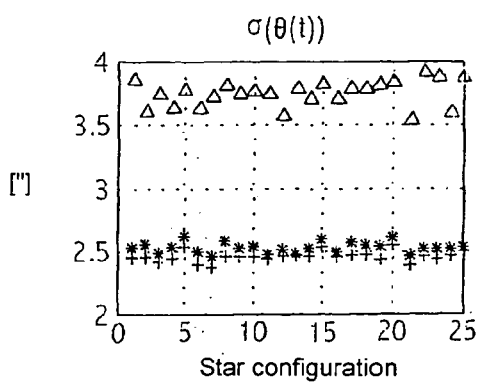
Figure 28E:
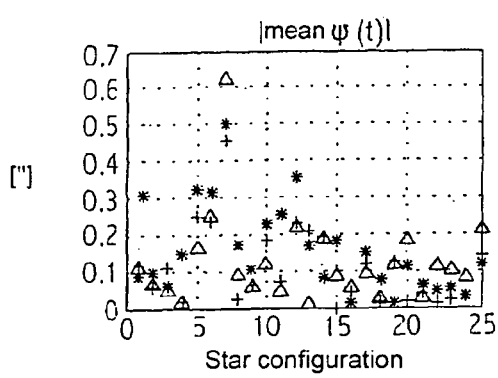
Figure 28F:
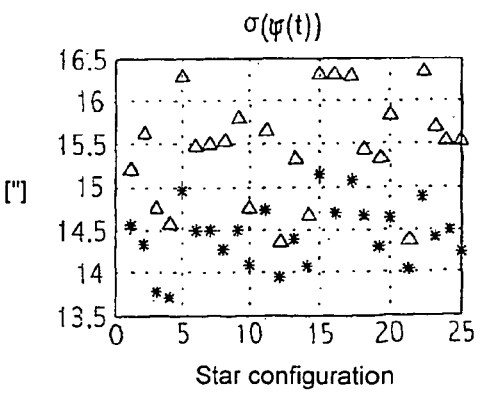

FIG. 26 shows the same time-varying curves as FIG. 24, when using a filter that estimates distortion. This shows filtering not only of inertial biases, but also of energy levels at low frequencies (maximum value equal to 0.5") as shown in FIG. 27 where the spectrum densities of the signal are plotted.

The results of a simulation with the star fields moving at a speed of 0.1°/s are described below. The duration of the simulation was 1000 s. This is not very realistic (it amounts to rotating about a stationary axis at high speed over a relatively long duration) but it enables white noise type errors to be averaged over a large number of shots.

Values Relating to Mean Values of Attitudes:

In this case also, the results-show that the standard deviations are unaffected by the movement of the satellite.

The influence of speed on the spectral content of attitude errors is described below.

There follows a description of a spectral model of errors due to distortion residue.

The idea is to obtain the spectral content of the noise due to the distortion residue when modeled as described above.

With inertial pointing, distortion is responsible for a bias that depends on the configuration of the stars, as described above. When the satellite is rotating at a non-zero speed in the frame of reference, the star field varies over time, leading to fluctuations in this bias. This leads to the appearance of low frequency variations that are subject to the characteristic time τ of field of view renewal.

Figure 29A:
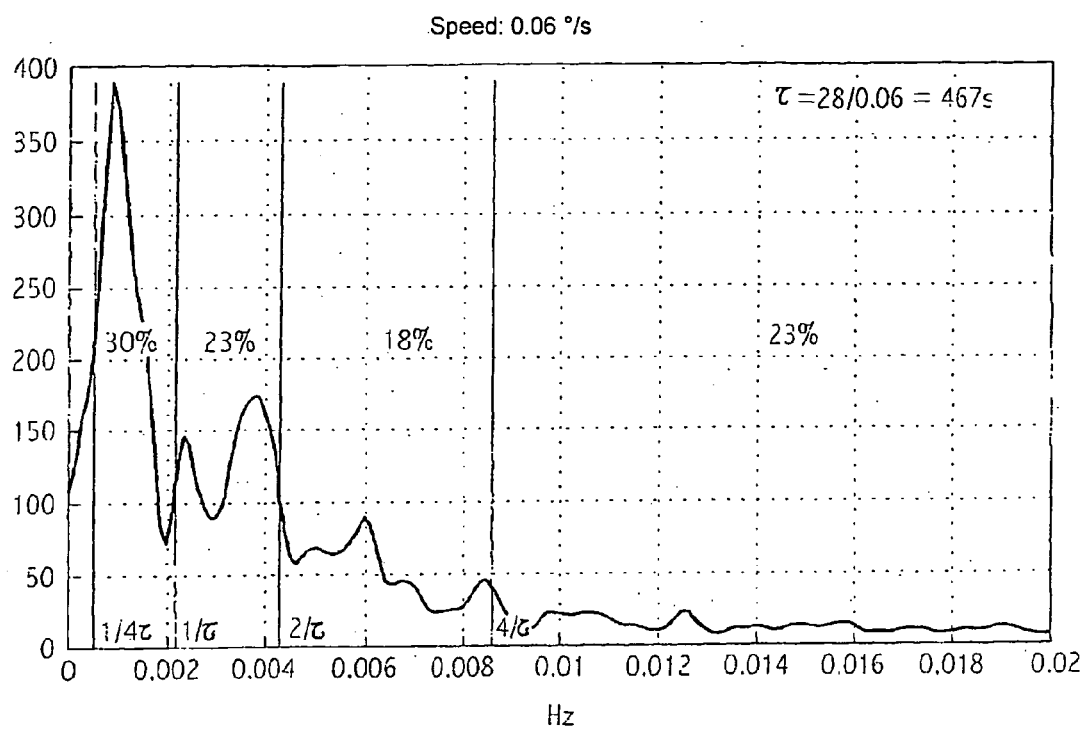
FIGS. 29a and 29b show spectrum densities of distortion residue.
Figure 29B:
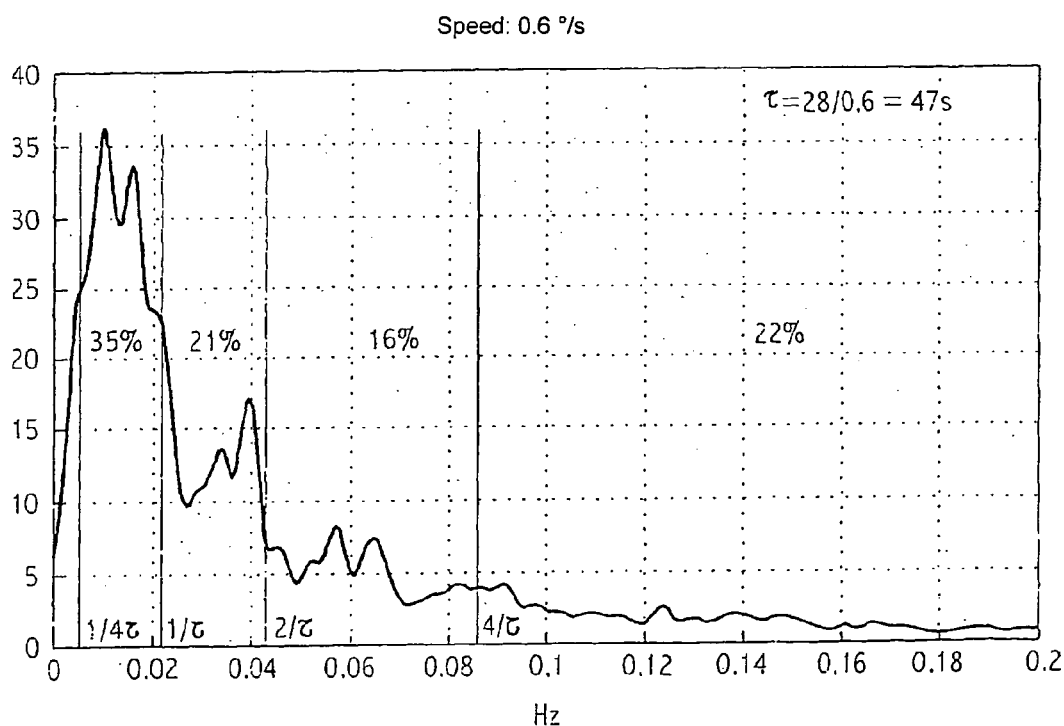
Figure 30A:
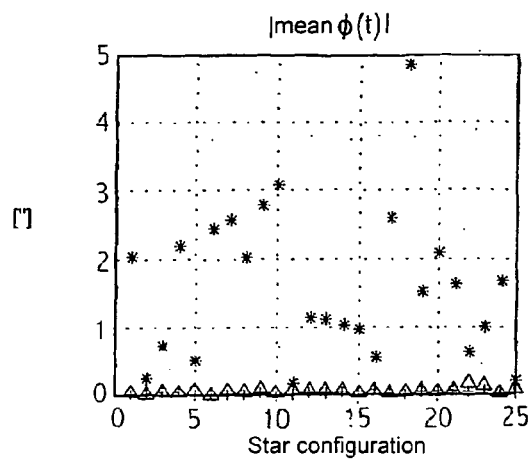
FIGS. 30a to 30f show the result of estimation with a radial distortion relationship including a third-order parameter.
Figure 30B:
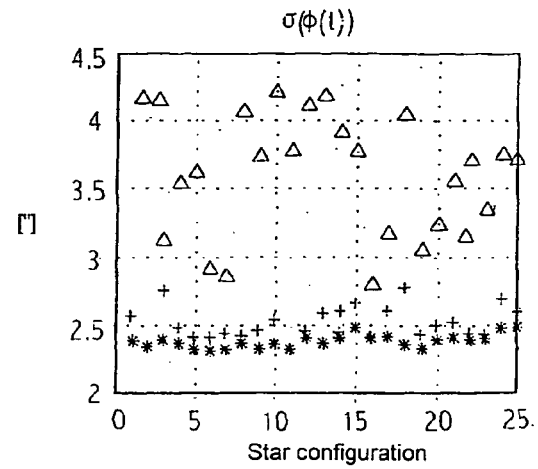
Figure 30C:
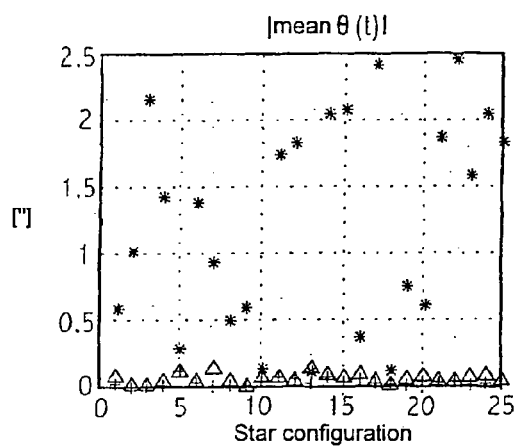
Figure 30D:
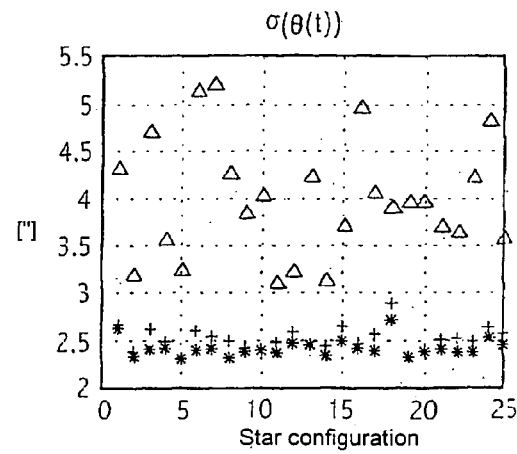
Figure 30E:
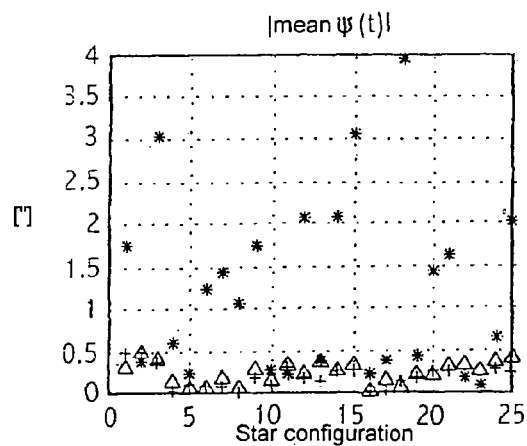
Figure 30F:
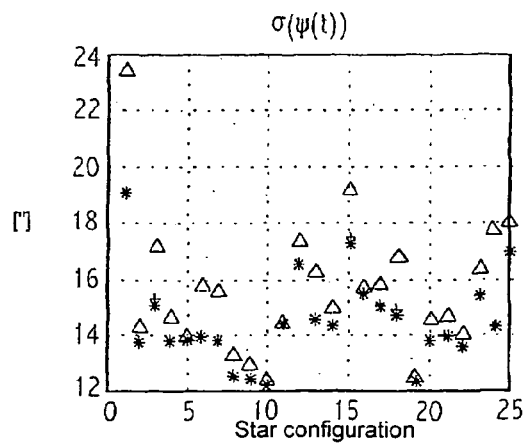
Figure 31A:
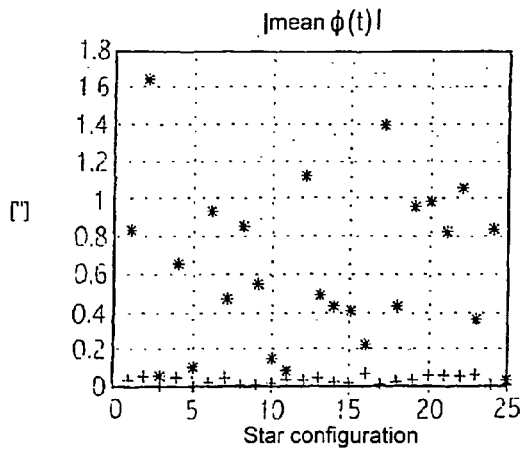
FIGS. 31a to 31f show the result of estimating with a "vibration" type pointing error of 500 micrometers (μm)
Figure 31B:
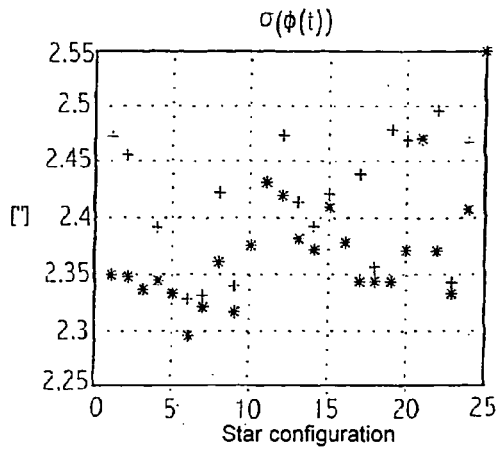
Figure 31C:
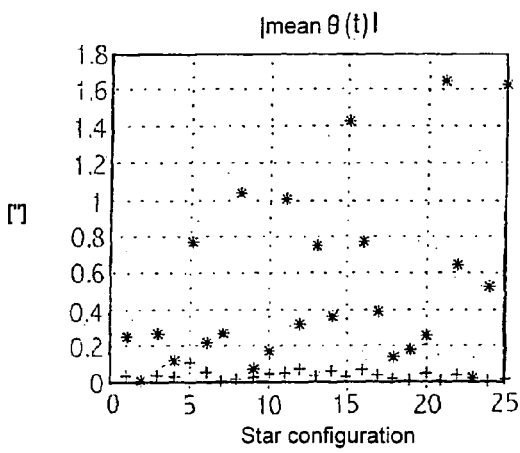
Figure 31D:
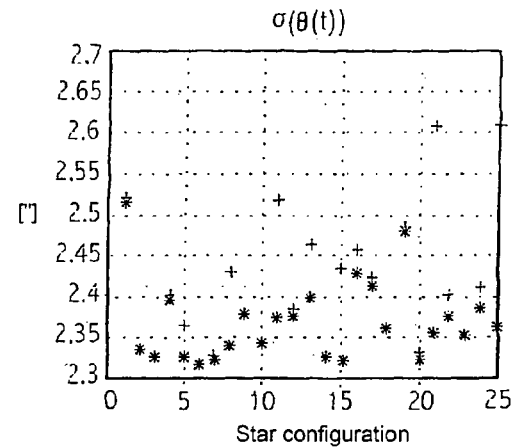
Figure 31E:
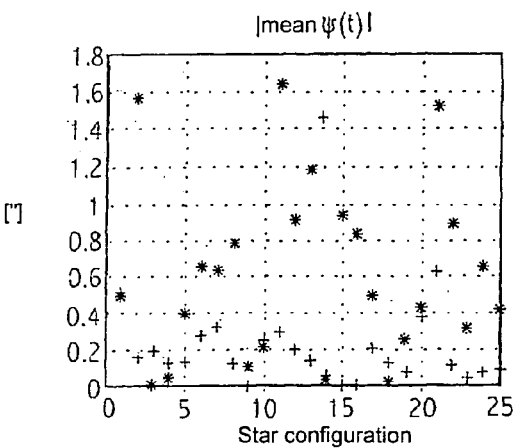
Figure 31F:
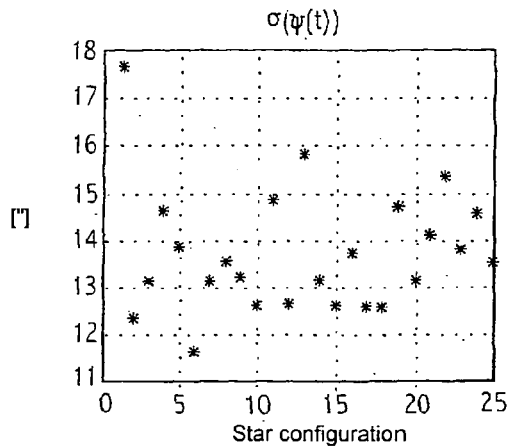
Figure 32A:
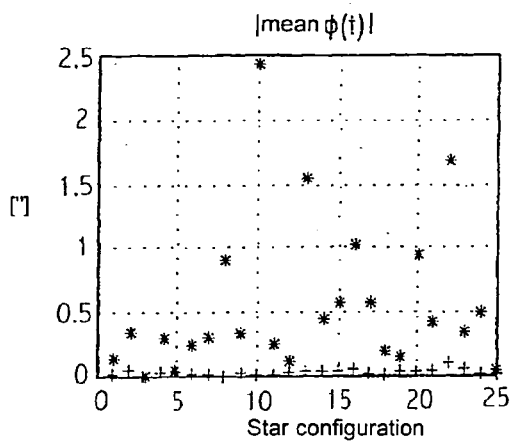
FIGS. 32a to 32f show the result of estimation with a "bias" type pointing error of 500 μm.
Figure 32B:
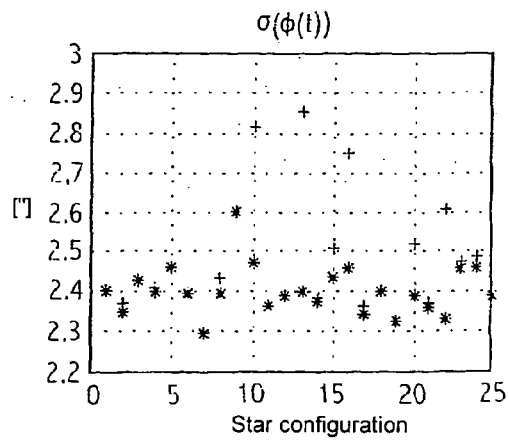
Figure 32C:
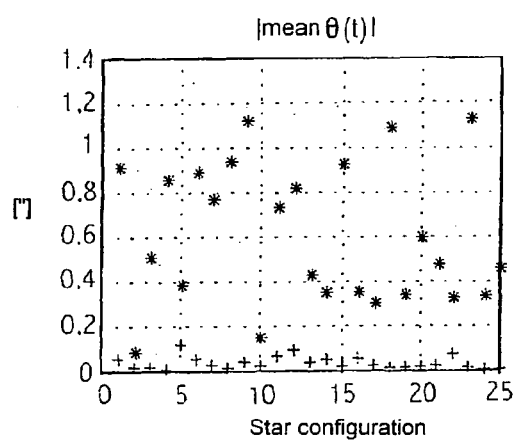
Figure 32D:
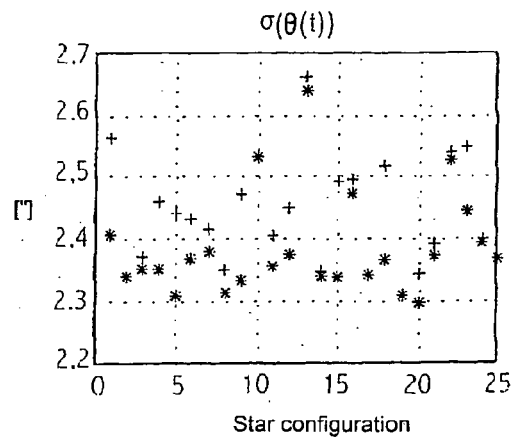
Figure 32E:
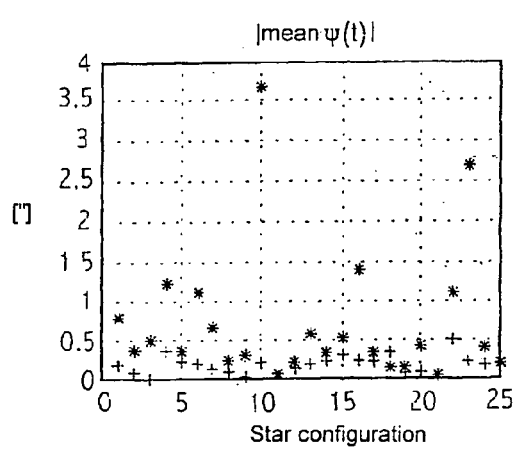
Figure 32F:
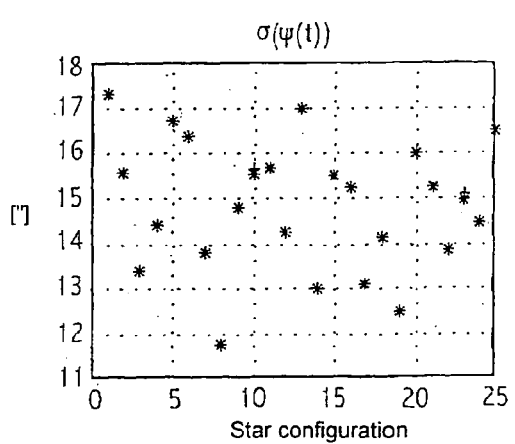
Figure 34A:
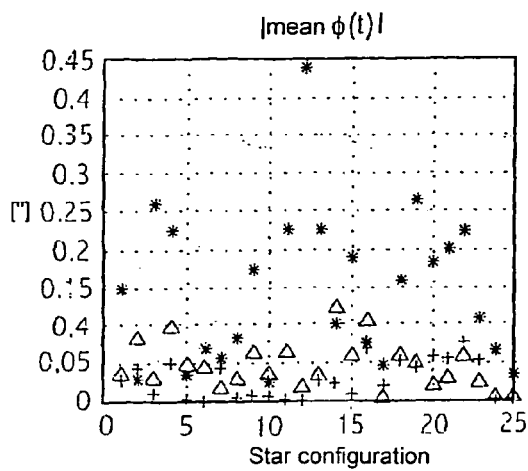
FIGS. 34a to 34f show results obtained with distortion errors that are five times smaller.
Figure 34B:
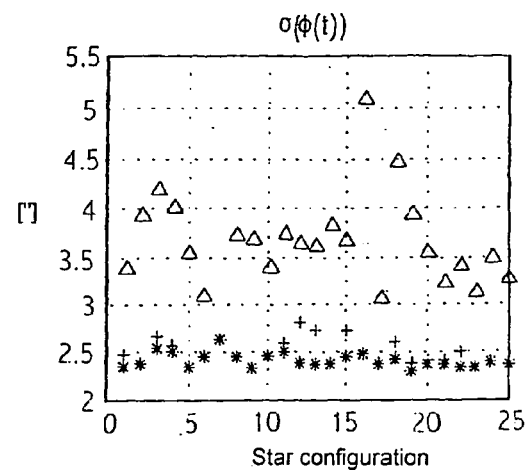
Figure 34C:
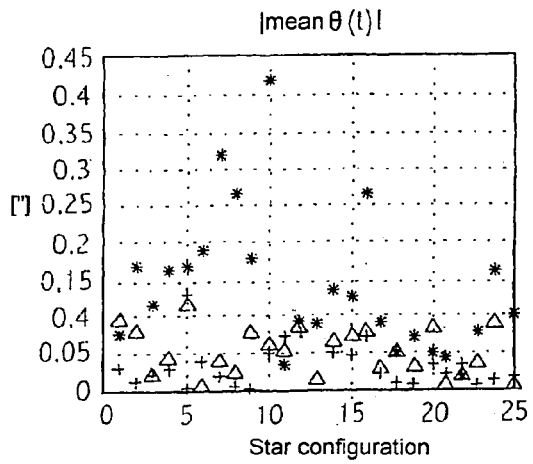
Figure 34D:
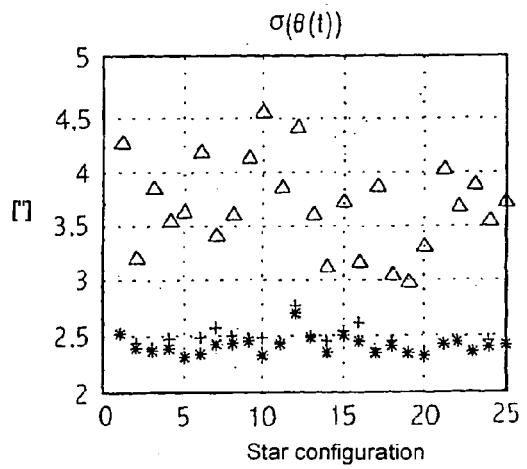
Figure 34E:
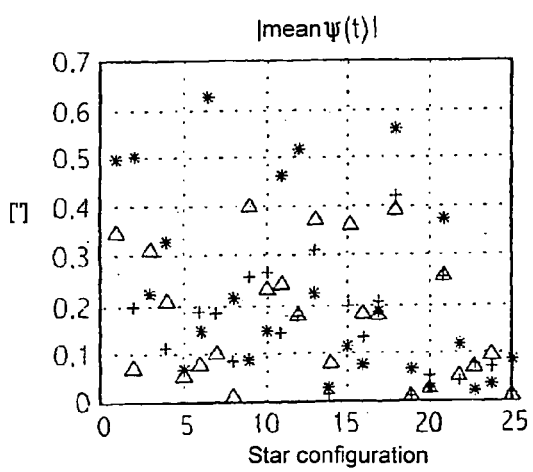
Figure 34F:
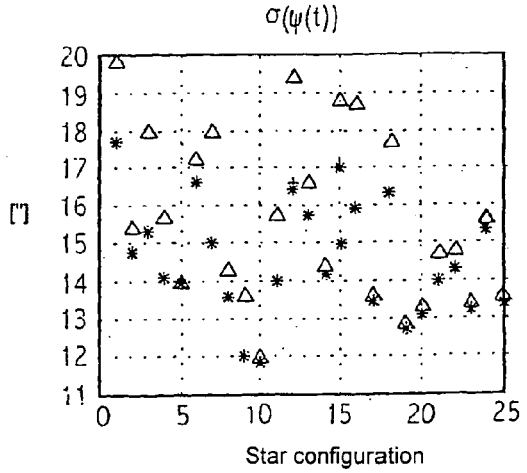
Figure 35A:
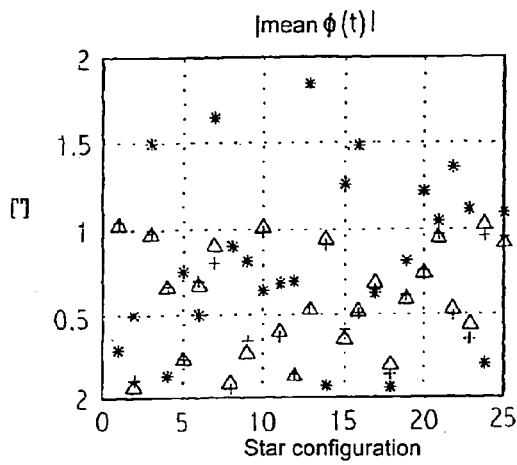
FIGS. 35a to 35f show results obtained with non-radial type errors of 1"
Figure 35B:
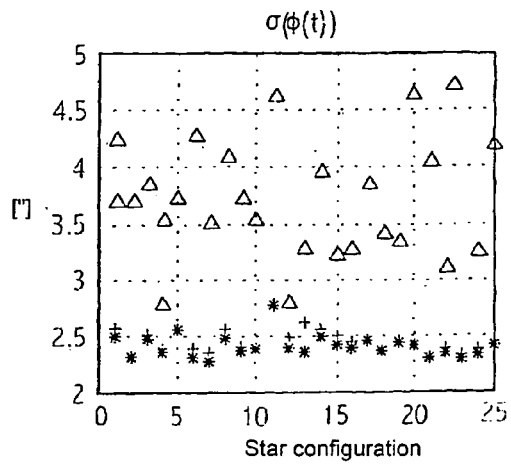
Figure 35C:
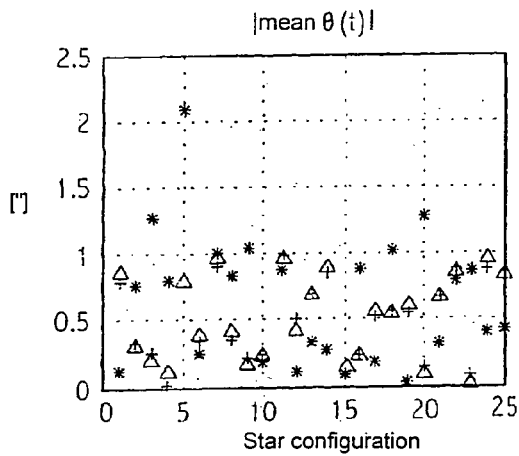
Figure 35D:
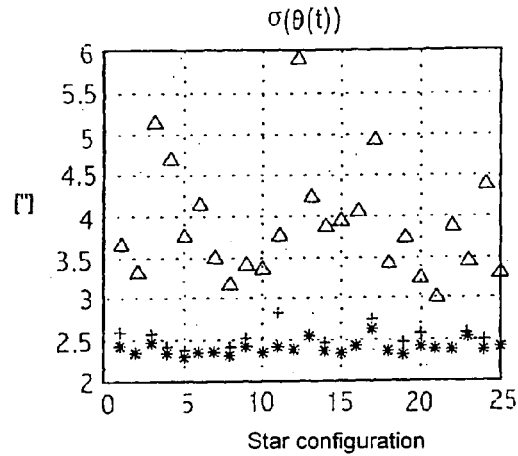
Figure 35E:
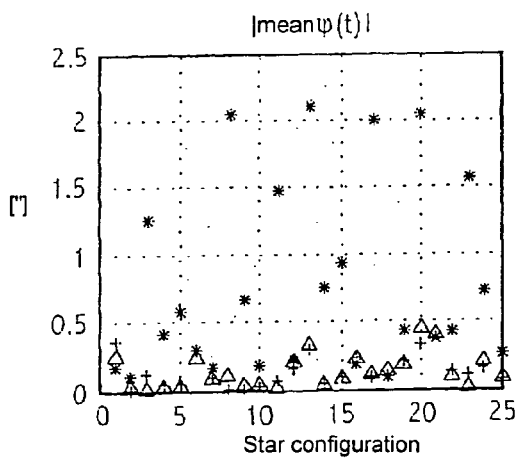
Figure 35F:
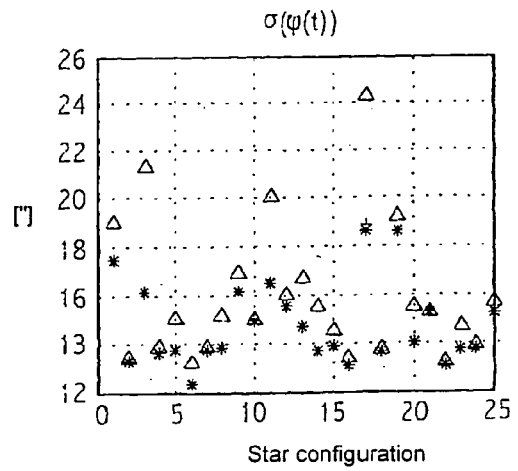
Figure 36A:
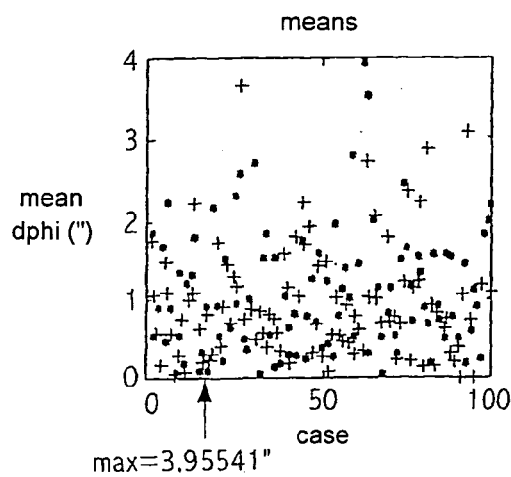
FIGS. 36a to 36f show results obtained with non-radial type errors of 5".
Figure 36B:
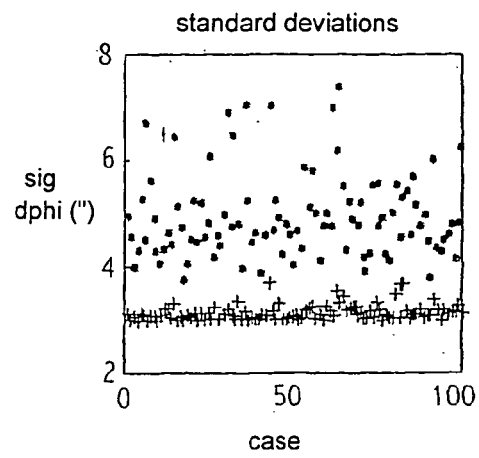
Figure 36C:
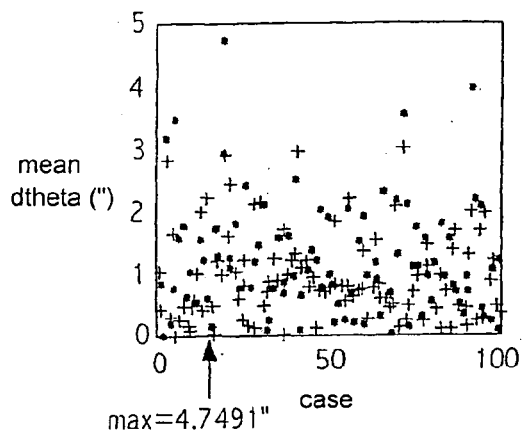
Figure 36D:
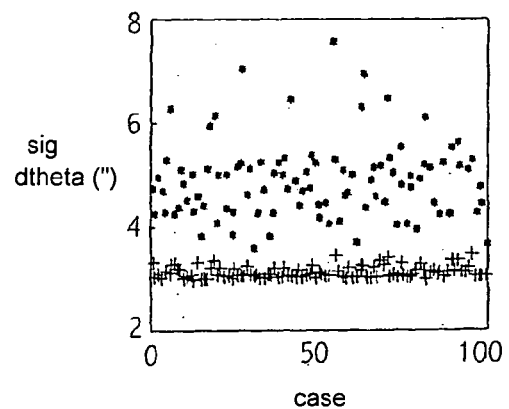
Figure 36E:
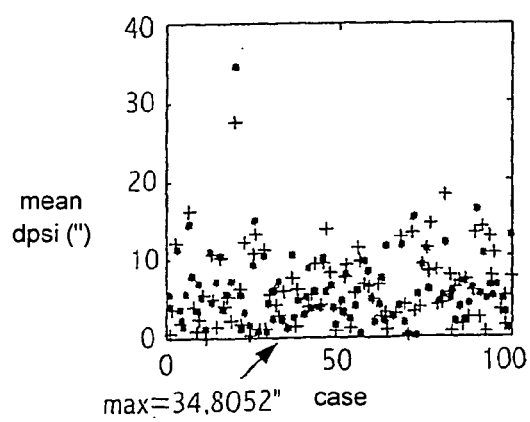
Figure 36F:
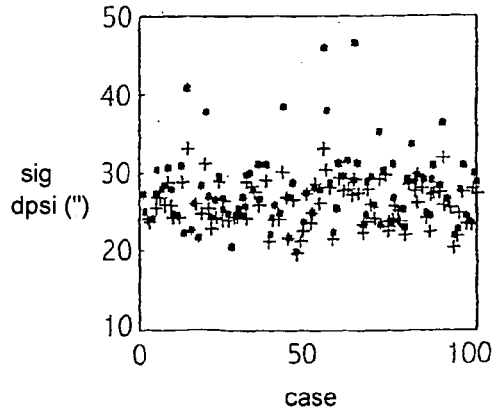

The spectrum densities have been calculated for errors in attitude on the cross axes as obtained in the presence of distortion noise only, in six different time simulations. FIG. 29 shows the appearance of mean density at two different movement speeds (0.06°/s and 0.6°/s).

It can be seen that mean energy is distributed over the frequency range [0 to 2 Hz] in a manner that depends on τ that can be summarized as follows:

| | [0, 1/4τ] | [1/4τ, 1/τ] | [1/τ, 2/τ] | [2/τ, 4/τ] | [4/τ, 2] |
|---|---|---|---|---|---|
| energy % | 6 | 33 | 22 | 17 | 22 |

This confirms the "harmonic" nature of FOV noise due to the distortion modeled in the manner described in this specification for a moving star field. This is no longer a bias

| | $\bar{\phi}$ max | $\bar{\phi}$ mean | σ($\bar{\phi}$) | $\bar{\theta}$ max | $\bar{\theta}$ mean | σ($\bar{\theta}$) | $\bar{\psi}$ max | $\bar{\psi}$ mean | σ($\bar{\psi}$) |
|---|---|---|---|---|---|---|---|---|---|
| 1-Conventional | 0.453 | 0.030 | 0.222 | 0.455 | 0.047 | 0.216 | 0.502 | 0.015 | 0.195 |
| 2-Distortion | 0.141 | 0.000 | 0.047 | 0.077 | 0.015 | 0.034 | 0.452 | 0.032 | 0.153 |
| 3-F_length | 0.133 | 0.026 | 0.066 | 0.163 | 0.025 | 0.061 | 0.615 | 0.031 | 0.172 |

There can be seen a reduction in the maximum mean value of the attitude error with the conventional algorithm which goes for the angle φ from 0.57" (at 0.06°/s) to 0.45". This can be explained by the fact that since the rate of change is greater in the present case, the number of stars used for estimating attitude is greater, thereby providing better "averaging".

In contrast, the performance levels obtained with the two non-classic algorithms continue to be of the same order of magnitude (about 0.1" in maximum value).

Values Relating to Standard Deviations:

| | φ | | θ | | ψ | |
|---|---|---|---|---|---|---|
| | σ max | σ mean | σ max | σ mean | σ max | σ mean |
| 1-Conventional | 2.583 | 2.511 | 2.616 | 2.524 | 15.139 | 14.437 |
| 2-Distortion | 2.521 | 2.445 | 2.548 | 2.456 | 15.118 | 14.429 |
| 3-F_length | 4.111 | 3.752 | 3.910 | 3.741 | 16.312 | 15.436 | of the kind that is found with inertial pointing. These errors can be modeled by assuming that all of the energy lies in the frequency range [1/4τ; 2/τ].

In terms of robustness analysis, the above results can easily be compared by investigating robustness of the algorithm:

in the face of estimating distortion residue of order 3 or 5;
in the face of pointing error (insofar as the method relies on linearizing the equations about a reference attitude);
in the face of the assumed relative weight for distortion compared with measurement noise; and
in the face of FOV errors of non-radial type. At this stage the algorithm has only been validated in the presence of errors that comply with the expected model. The robustness of the algorithm faced with other types of error, and in particular with non-radial-error can easily be evaluated.

The robustness of the algorithms is investigated solely for inertial pointing: since FOV errors lead directly to a bias, these results are easier to analyze. In addition, the way in which FOV type errors vary over time is less well known.

In each of the robustness analyses, a series of 25 time varying simulations were performed (each of duration equal to 1000 s) and the maximum mean values and the maximum standard deviations of the attitude errors were calculated making it possible to characterize the behavior of the algorithms. These results should be compared with those obtained when studying an unchanging star field with the nominal assumptions (FIG. 4), the results of which are recalled on each occasion.

For estimating the $D_3$ term of distortion residue, it is assumed that the distortion residue is not solely of order 5 (the $D_5$ parameter), but that there remains a contribution of order 3 (parameter $D_3$) associated with the estimation error that occurred during calibration. The algorithm for estimating distortion is then modified to take account of radial errors of third order.

It is recalled that the same model is used when generating simulation measurements.

It is assumed that the contributions of $D_5$ and $D_3$ are of the same order of magnitude, i.e. 9" at the edge of the field.

This gives: $D_3 = 0.03$ m$^{-2}$ and $D_5 = 6$ m$^{-4}$.

The result is illustrated by FIG. 30 and summarized in the table below.

Summary of "Nominal" Results:

| | φ | | θ | | ψ | |
|---|---|---|---|---|---|---|
| | $\bar{\phi}$ max | σ max | $\bar{\theta}$ max | σ max | $\bar{\psi}$ max | σ max |
| 1-Conventional | 1.82 | 2.52 | 1.76 | 2.67 | 2.50 | 19.95 |
| 2-Distortion | 0.06 | 2.70 | 0.11 | 2.93 | 0.30 | 19.98 |
| 3-F_length | 0.11 | 4.33 | 0.13 | 4.87 | 0.34 | 22.91 |

Results of Simulation

| | φ | | θ | | ψ | |
|---|---|---|---|---|---|---|
| | $\bar{\phi}$ max | σ max | $\bar{\theta}$ max | σ max | $\bar{\psi}$ max | σ max |
| 1-Conventional | 4.846 | 2.48 | 2.443 | 2.69 | 3.966 | 19.05 |
| 2-Distortion | 0.067 | 2.78 | 0.121 | 2.86 | 0.483 | 19.07 |
| 3-F_length | 0.157 | 4.21 | 0.134 | 5.18 | 0.490 | 23.37 |

The relative value of distortion at the edge of the field has been doubled, assuming two 9" contributions of different orders. This can be observed on the performance obtained with conventional filtering where there is a very clear increase in the maximum mean value. In contrast, the performance levels achieved by distortion filtering are equivalent in both cases.

In addition, the estimation of the additional parameter $D_3$ leads to a very small increase only in the noise level associated with the increase in the number of unknowns.

For pointing errors, it is again assumed, as it is throughout thereafter, that the distortion residue is of order 5 only.

Account has been taken of a pointing error drawn randomly in application of a distribution relationship that is uniform with amplitude 500 μrad on all three axes.

Initially, the pointing error was drawn randomly for each time step ("vibration type"), and subsequently it was assumed to be constant throughout a simulation ("bias type").

Recall of "Nominal" Results:

| | φ | | θ | | ψ | |
|---|---|---|---|---|---|---|
| | $\bar{\phi}$ max | σ max | $\bar{\theta}$ max | σ max | $\bar{\psi}$ max | σ max |
| 1-Conventional | 1.82 | 2.52 | 1.76 | 2.67 | 2.50 | 19.95 |
| 2-Distortion | 0.06 | 2.70 | 0.11 | 2.93 | 0.30 | 19.98 |

For "vibration" type pointing errors, the results are shown in FIG. 31 and summarized in the table below.

| | φ | | θ | | ψ | |
|---|---|---|---|---|---|---|
| | $\bar{\phi}$ max | σ max | $\bar{\theta}$ max | σ max | $\bar{\psi}$ max | σ max |
| 1-Conventional | 1.64 | 2.55 | 1.64 | 2.51 | 1.64 | 17.74 |
| 2-Distortion | 0.064 | 2.55 | 0.108 | 2.61 | 0.62 | 17.74 |

For "bias" type pointing errors, the results are illustrated by FIG. 32 and summarized in the table below.

| | φ | | θ | | ψ | |
|---|---|---|---|---|---|---|
| | $\bar{\phi}$ max | σ max | $\bar{\theta}$ max | σ max | $\bar{\psi}$ max | σ max |
| 1-Conventional | 2.42 | 2.60 | 1.13 | 2.63 | 3.66 | 17.31 |
| 2-Distortion | 0.09 | 2.85 | 0.12 | 2.66 | 0.48 | 17.35 |

In both cases, the order of magnitude of standard deviations is unaffected.

It can be seen that the reduction in attitude bias by means of the algorithm continues to be observed, returning to levels of performance that are close to the nominal case.

The algorithm is thus robust against pointing errors of the same order of magnitude as the errors that are expected.

Concerning robustness in the face of the distortion/noise ratio, simulations have been carried out in succession with assumptions that were five times greater and five times smaller concerning distortion error, while the noise level remained unchanged (37").

The respective results are shown in FIGS. 33 and 34 and summarized in the tables below.

Reminder of "Nominal" Results:

| | φ | | θ | | ψ | |
|---|---|---|---|---|---|---|
| | $\bar{\phi}$ max | σ max | $\bar{\theta}$ max | σ max | $\bar{\psi}$ max | σ max |
| 1-Conventional | 1.82 | 2.52 | 1.76 | 2.67 | 2.50 | 19.95 |
| 2-Distortion | 0.06 | 2.70 | 0.11 | 2.93 | 0.30 | 19.98 |
| 3-F_length | 0.11 | 4.33 | 0.13 | 4.87 | 0.34 | 22.91 |

For Distortion that is Five Times Greater:

| | φ | | θ | | ψ | |
|---|---|---|---|---|---|---|
| | $\bar{\phi}$ max | σ max | $\bar{\theta}$ max | σ max | $\bar{\psi}$ max | σ max |
| 1-Conventional | 11.04 | 2.48 | 5.60 | 2.69 | 11.27 | 19.05 |
| 2-Distortion | 0.07 | 2.75 | 0.12 | 2.70 | 0.48 | 19.06 |
| 3-F_length | 0.16 | 4.21 | 0.13 | 5.18 | 0.49 | 23.37 |

For Distortion that is Five Times Smaller:

|  | φ | | θ | | ψ | |
| --- | --- | --- | --- | --- | --- | --- |
|  | $\bar{\phi}$ max | σ max | $\bar{\theta}$ max | σ max | $\bar{\psi}$ max | σ max |
| 1-Conventional | 0.44 | 2.63 | 0.42 | 2.70 | 0.63 | 17.74 |
| 2-Distortion | 0.07 | 2.80 | 0.12 | 2.76 | 0.50 | 17.74 |
| 3-F_length | 0.12 | 5.09 | 0.11 | 4.52 | 0.40 | 19.81 |

The standard deviations of attitude error are insensitive to assumptions about distortion; they depend only on the level of measurement noise and on the algorithm used.

Similarly, the use of one of the two algorithms enables the value of the bias to be reduced to a level of performance that is generally independent of the assumption about distortion.

In contrast, the algorithm estimating the distortion coefficients does not degrade noise, unlike the algorithm for estimating local focal lengths: it can therefore be implemented even when the level of distortion is very low.

Concerning robustness to other FOV type errors that are not radial, there exist other sources of error in the FOV category that depend on the star and/or its position in the field:

chromatic aberrations (distribution that is a priori radial);

catalog errors (distribution random);

interpolation errors (distribution random).

Their impact on attitude measurement also leads to bias (with inertial pointing) associated with the configuration of the stars in the field and varies a great deal from one sensor to another.

Attempts have therefore been made to assess the robustness of the algorithm to an error that is distributed randomly in amplitude and direction as a function of each star and that is constant throughout the simulation in inertial pointing. The error was drawn randomly in application of a relationship of uniform amplitudes respectively equal to 1″ and 5″.

The respective results are shown in FIGS. 35 and 36, and summarized in the following tables.

Reminder of "Nominal" Results:

|  | φ | | θ | | ψ | |
| --- | --- | --- | --- | --- | --- | --- |
|  | $\bar{\phi}$ max | σ max | $\bar{\theta}$ max | σ max | $\bar{\psi}$ max | σ max |
| 1-Conventional | 1.82 | 2.52 | 1.76 | 2.67 | 2.50 | 19.95 |
| 2-Distortion | 0.06 | 2.70 | 0.11 | 2.93 | 0.30 | 19.98 |
| 3-F_length | 0.11 | 4.33 | 0.13 | 4.87 | 0.34 | 22.91 |

For an Error of Amplitude 1″:

|  | φ | | θ | | ψ | |
| --- | --- | --- | --- | --- | --- | --- |
|  | $\bar{\phi}$ max | σ max | $\bar{\theta}$ max | σ max | $\bar{\psi}$ max | σ max |
| 1-Conventional | 1.82 | 2.77 | 2.09 | 2.62 | 2.07 | 18.60 |
| 2-Distortion | 1.03 | 2.78 | 1.00 | 2.82 | 0.40 | 18.74 |
| 3-F_length | 1.03 | 4.68 | 0.96 | 5.90 | 0.42 | 24.22 |

For an Error of Amplitude 5″:

|  | φ | | θ | | ψ | |
| --- | --- | --- | --- | --- | --- | --- |
|  | $\bar{\phi}$ max | σ max | $\bar{\theta}$ max | σ max | $\bar{\psi}$ max | σ max |
| 1-Conventional | 5.32 | 2.77 | 4.66 | 2.62 | 2.17 | 18.60 |
| 2-Distortion | 4.94 | 2.78 | 4.80 | 2.82 | 0.42 | 18.74 |
| 3-F_length | 4.96 | 4.68 | 4.80 | 5.89 | 0.43 | 24.22 |

Substantially the same values are to be found for standard deviations, meaning that noise level in this case does not depend on assumptions about FOV errors, but solely on measurement noise.

In contrast, concerning bias, it can be seen that there is a loss of effectiveness for both algorithms since the reduction is by a factor of only 2 for non-radial error of 1″ and is no longer perceptible for non-radial error of 5″.

It is recalled that the assumption concerning distortion residue is 9″ at the edge of the field (deterministic error), whereas the contribution of these non-radial errors takes place randomly for given amplitude. This explains why amplitude error performance is not excessively degraded when the amplitude is equal to 1″.

The effectiveness of both algorithms is somewhat limited by the presence of FOV errors having a distribution that is not radial. Nevertheless, the algorithm proposed (see "distortion" algorithm) does not introduce noise degradation, so at the worst it merely becomes useless.

The use of an algorithm for estimating distortion coefficients instead of focal lengths turns out to be advantageous if it is assumed that distortion residues that can be modeled in application of the radial relationship set-out above.

This algorithm makes it possible to filter the errors due to distortion, and in particular:

biases (reduction by a factor of about 10) in inertial pointing; and low frequency errors ([0; 0.05] Hz) that appear with a moving star field.

In addition, the small number of parameters that need to be estimated (4 or 5), means that unlike the algorithm that estimates local focal lengths, the high frequency noise level is not harmed by such processing.

The algorithm proposed is simple. It can be implemented inline in processing measurements at star level. It preferably relies on approximate knowledge of the attitude to be measured, of a kind compatible with pointing specifications.

The robustness analyses show that certain limits exist on the effectiveness of the algorithm, in particular when the contribution of FOV errors having non-radial distribution is large compared with distortion residue (modeled in radial manner). Nevertheless the use of the algorithm for estimating distortion coefficients does not degrade the signal which means that it can be included in all cases.

The advantage of this algorithm that estimates distortion parameters is further improved by a fine assessment of the physics of the sensor, or indeed by finer modeling of sensor errors, possibly relying on tests performed on a mockup.

Figure 37:
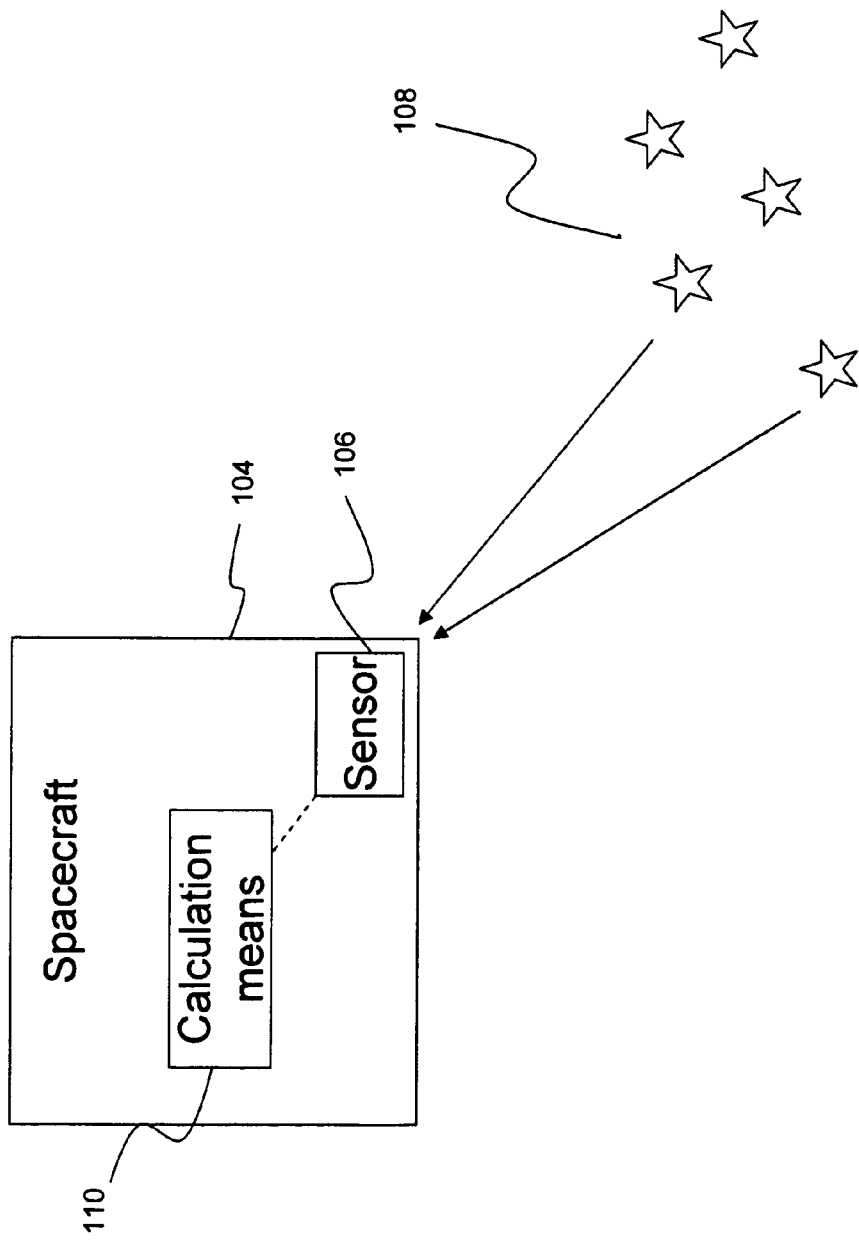
FIG. 37 shows an apparatus for determining the attitude of a spacecraft.

FIG. 37 shows an apparatus for determining the attitude of a spacecraft 104 using an optical star sensor 106. The apparatus includes an optical star sensor 106 arranged to sense the projections of a plurality of stars 108 on said sensor 106. The apparatus further comprises a calculation means 110 suitable which determines the values of the attitude angles of the spacecraft 104 relative to the stars 108 by solving a system of equations which have as inputs the projections of the stars 108 on the sensor 106 and also a reference focal length of the sensor 106. The equation uses the focal length to convert the star projections into sensor-star directions in a frame of reference associated with the sensor. The calculation means 110 takes into account one or more parameters defining a series of focal length errors as one or more parameters in the system of equations, each focal length error having an influence on converting the projection of a respective star into its corresponding sensor-star direction. The calculation means 110 determines the parameters defining a series of focal length errors simultaneously with determining the values for the attitude angles of the spacecraft 104.

The invention claimed is:

1. A method of determining the attitude ($\phi$, $\theta$, $\Psi$) of a spacecraft, the method comprising:
   a) sensing the projections (xmi, ymi) of a plurality of stars on an optical star sensor mounted on the spacecraft;
   b) providing a reference focal length ($f_{ref}$) for said sensor, said focal length serving to convert the projections of the stars (xmi, ymi) as picked up on the sensor into sensor-star directions (wi) in a frame of reference associated with the sensor; and
   c) determining the angular values of the attitude of the spacecraft relative to the stars by solving a system of equations which has as its input data in particular the projections of the stars (xmi, ymi) on the sensor and the reference focal length of the sensor;
   the method being characterized by introducing, as unknowns in the system of equations, at least one parameter ($D_1, \ldots, D_7$) defining a series of focal length errors, each of which errors has an influence on converting the projection (xmi, ymi) of a respective star into the corresponding sensor-star direction ($W_i$); and
   in step c), by determining said parameter(s) ($D_1, \ldots, D_7$) simultaneously with determining the values for the attitude angles ($\phi$, $\theta$, $\Psi$) of the spacecraft;
   in such a manner that taking said focal length error parameter(s) into account as unknowns in the system reduces the uncertainty introduced by incomplete knowledge of these errors on the results for the values of the attitude angles ($\phi$, $\theta$, $\Psi$) of the spacecraft.

2. A method according to claim 1, characterized in that the spacecraft is a satellite, and in that the attitude determined by the method is the attitude of the satellite.

3. A method according to claim 1, characterized in that step b) also provides an approximate orientation (vi) for each star relative to the sensor, the determination of the values of the attitude angles of the device consisting in determining the orientation errors ($\phi$, $\theta$, $\Psi$) relative to said approximation orientation (vi).

4. A method according to claim 1, characterized in that the system of equations is a linear system.

5. A method according to claim 1, characterized in that the parameter(s) ($D_1, \ldots, D_7$) introduced into the system of equations and defining a series of focal length errors consists in at least one parameter defining a relationship for variation in focal length as a function of the position of the projection of a star on the sensor.

6. A method according to claim 5, characterized in that the relationship for variation in focal length as a function of the position of the projection of a star on the sensor (xmi, ymi) is a relationship that depends essentially on the distance (r) between the center of the sensor and the position of the projection of the star.

7. A method according to claim 6, characterized in that the relationship for variation in focal length as a function of the position of the projection of the star on the sensor is a polynomial function of the distance (r) between the optical center of the sensor situated on the optical paraxial axis of the sensor and the projection of the position of the star.

8. A method according to claim 7, characterized in that the relationship for variation in focal length is of the type:

$$f' = (1 D_5 r^4) \cdot f$$

where $r$ is the radius of the center of the sensor and the position of the projection of the star on the sensor, $f$ is the reference focal length, $f'$ is the focal length given as a function of the radius, and $D_5$ is the parameter that is to be determined.

9. A method according to claim 1, characterized in that the system of equations has the following form:

$$\Delta_i = \begin{pmatrix} \dfrac{xm_i - x_i}{f_{ref}} \\ \dfrac{ym_i - y_i}{f_{ref}} \end{pmatrix}$$

$$= \begin{pmatrix} \dfrac{vix \cdot viy}{viz^2} & -\left(1 + \dfrac{vix^2}{viz^2}\right) & \dfrac{viy}{viz} & 0 \ldots 0 & \dfrac{vix}{viz} & 0 \ldots 0 \\ \left(1 + \dfrac{viy^2}{viz^2}\right) & -\dfrac{vix \cdot viy}{viz^2} & -\dfrac{vix}{viz} & 0 \ldots 0 & \dfrac{viy}{viz} & 0 \ldots 0 \end{pmatrix}$$

$$\cdot \begin{pmatrix} \varphi \\ \theta \\ \psi \\ \vdots \\ \delta f s f_1 \\ \vdots \end{pmatrix}$$

$$= J_i \cdot \begin{pmatrix} \varphi \\ \theta \\ \psi \\ \vdots \\ \delta f s f_1 \\ \vdots \end{pmatrix}$$

where xmi and ymi are the coordinates of the sensed projection of a star i on a projection surface of the sensor along two perpendicular axes x and y, xi and yi are the reference coordinates of the projection of said star on said axes; vix and viy are the coordinates on the same axes of a reference orientation vector for said star i; viz is a coordinate of said reference orientation vector along an axis (z) perpendicular to the projection surface of the sensor; $\delta fsf_i$ is a focal length error applied to the star i; $\phi$, $\theta$, $\Psi$ are angles of rotation about the three axes (x, y, z) of the sensor between the reference attitude and the attitude to be determined of the spacecraft, and $f_{ref}$ is the reference focal length of the sensor.

10. Apparatus for determining the attitude of a spacecraft using an optical star sensor, the apparatus including such an optical star sensor arranged to sense the projections (xmi, ymi) of a plurality of stars of said sensor, the apparatus further comprising calculation means suitable for determining the values of attitude angles ($\phi$, $\theta$, $\Psi$) of the spacecraft relative to the stars by solving a system of equations having as its inputs specifically the projections of the stars (xmi, ymi) on the sensor and also a reference focal length ($f_{ref}$) of the sensor, said focal length serving to convert the star projections (xmi, ymi) into sensor-star directions (wi) in a frame of reference associated with the sensor, the apparatus being characterized in that the calculation means are arranged to take account of one or more parameters ($D_1, \ldots, D_7$) defining a series of focal length errors as one or more additional parameters in the system of equations, each of which errors has an influence on converting the projection (xmi, ymi) of a respective star into the corresponding sensor-star direction (wi), the calculation means being arranged to determine said parameter(s) ($D_1, \ldots, D_7$)

defining a series of focal length errors simultaneously with determining the values for the attitude angles ($\phi$, $\theta$, and $\Psi$) of the spacecraft.

11. Apparatus according to claim 10, characterized in that the parameter(s) ($D_1$, . . . , $D_7$) forming one or more unknowns in the system of equations and defining a series of focal length errors constitute one or more parameters defining a relationship for variation in focal length as a function of the projection of a star on the sensor, which relationship gives the focal length error essentially as a function of a distance (r) measured between the center of the sensor and the position of the projection.

12. A satellite, characterized in that it includes apparatus according to claim 10.

* * * * *